(12) United States Patent
Hirooka et al.

(10) Patent No.: US 11,692,944 B2
(45) Date of Patent: Jul. 4, 2023

(54) APPARATUS FOR INSPECTING PLATE-LIKE BODIES

(71) Applicant: YOSHINO GYPSUM CO., LTD., Tokyo (JP)

(72) Inventors: Yuichi Hirooka, Tokyo (JP); Kenichi Hashikura, Tokyo (JP)

(73) Assignee: YOSHINO GYPSUM CO., LTD., Tokyo (JP)

( * ) Notice: Subject to any disclaimer, the term of this patent is extended or adjusted under 35 U.S.C. 154(b) by 82 days.

(21) Appl. No.: 17/417,866

(22) PCT Filed: Jan. 29, 2020

(86) PCT No.: PCT/JP2020/003214
§ 371 (c)(1),
(2) Date: Jun. 24, 2021

(87) PCT Pub. No.: WO2020/174990
PCT Pub. Date: Sep. 3, 2020

(65) Prior Publication Data
US 2022/0099589 A1    Mar. 31, 2022

(30) Foreign Application Priority Data
Feb. 28, 2019    (JP) .................................. 2019-036625

(51) Int. Cl.
*G01N 21/892*    (2006.01)
(52) U.S. Cl.
CPC .................................. *G01N 21/892* (2013.01)
(58) Field of Classification Search
CPC .... G01N 21/958; G01N 21/896; G01N 21/88; G01N 21/9501; G01N 21/9503;
(Continued)

(56) References Cited

U.S. PATENT DOCUMENTS

| 2002/0101596 A1 | 8/2002 | Park et al. |
| 2009/0122304 A1* | 5/2009 | Jin ..................... G01N 21/9503 356/237.4 |
| 2016/0216214 A1 | 7/2016 | Yeh et al. |

FOREIGN PATENT DOCUMENTS

| CN | 202938798 U | 5/2013 |
| EP | 0778462 | 6/1997 |

(Continued)

OTHER PUBLICATIONS

Extended European Search Report dated Dec. 22, 2021 with respect to the corresponding European patent application No. 20763636.6.

(Continued)

*Primary Examiner* — Michael P Stafira
(74) *Attorney, Agent, or Firm* — IPUSA, PLLC

(57) ABSTRACT

An apparatus for inspecting plate-like bodies to inspect a side surface of a plate-like body with sheeted coating materials on a top side and bottom side of the plate-like body, is provided. The apparatus includes at least one light emitting unit configured to irradiate the side surface of the plate-like body with light. The apparatus includes at least one light receiving unit configured to receive light reflected with respect to the side surface of the plate-like body. The apparatus includes a conveying unit configured to move at least one among the light emitting unit and the plate-like body and to vary a position of the light on the side surface of the plate-like body, emitted by the light emitting unit. The apparatus includes a determining unit configured to determine whether the side surface of the plate-like body has a defect, by using the light emitted by the light emitting unit, upon occurrence of a condition under which the conveying unit varies the position of the light, on the side surface of the plate-like body, emitted by the light emitting unit.

6 Claims, 4 Drawing Sheets

(58) Field of Classification Search
CPC .... G01N 21/892; G01N 29/225; G01N 21/55; G01N 2021/845; G01N 21/00; G01N 2223/643; G01N 33/386; G01N 21/8806; G01N 21/8851; G01N 21/956; G01N 2021/8887; G01N 21/95; G01N 21/94; G01N 21/8901; G01N 21/952; G01N 21/89; G01N 21/95607; G01N 2291/044; G01N 29/043; G01N 21/9515; G01N 21/9508; G01N 2021/9513; G01N 29/265; G01N 21/8914; G01N 21/21; G01N 29/04; G01N 21/8803; G01N 21/8422; G01N 29/28; G01N 2291/0289; G01N 2291/106; G01N 21/95684; G01N 21/9054; G01N 21/8903; G01N 2021/8918; G01N 2021/8845; G01N 21/90; G01N 21/909; G01N 21/47; G01N 2291/2634; G01N 29/07; G01N 2021/8825; G01N 21/85; G01N 2291/02854; G01N 2021/95676; G01N 27/82; G01N 2021/8822; G01N 2291/0231; G01N 21/01; G01N 25/72; G01N 29/041; G01N 2021/95638; G01N 2021/8854; G01N 21/86; G01N 2291/267; G01N 2021/8848; G01N 2291/2694; G01N 2291/0237; G01N 21/84; G01N 21/93; G01N 2201/06113; G01N 2021/8816; G01N 2201/062; G01N 2291/2636; G01N 21/9081; G01N 23/04; G01N 29/223; G01N 2201/12; G01N 23/225; G01N 2021/8835; G01N 2291/0258; G01N 2291/0234; G01N 29/221; G01N 2021/8809; G01N 2021/8924; G01N 21/95623; G01N 29/11; G01N 29/46; G01N 2021/95615; G01N 2021/8829; G01N 21/9506; G01N 29/262; G01N 2021/8861; G01N 2033/0096; G01N 21/954; G01N 21/474; G01N 23/18; G01N 29/2418; G01N 2021/8908; G01N 21/91; G01N 2201/061; G01N 23/2251; G01N 29/2468; G01N 2021/8909; G01N 2291/011; G01N 2021/9586; G01N 21/9072; G01N 29/30; G01N 15/082; G01N 29/326; G01N 2021/8472; G01N 2021/8883; G01N 2021/8893; G01N 2021/8917; G01N 21/359; G01N 2201/102; G01N 23/083; G01N 2021/8427; G01N 2291/051; G01N 21/898; G01N 29/069; G01N 29/24; G01N 29/27; G01N 2021/8841; G01N 21/9036; G01N 27/9046; G01N 33/00; G01N 21/9505; G01N 27/902; G01N 21/8986; G01N 2291/2632; G01N 27/84; G01N 2021/8812; G01N 21/64; G01N 2021/888; G01N 21/4788; G01N 29/0645; G01N 2021/177; G01N 2291/048; G01N 2021/8867; G01N 21/27; G01N 21/3563; G01N 21/4738; G01N 2223/646; G01N 2291/023; G01N 29/4445; G01N 2021/4792; G01N 21/9027; G01N 27/904; G01N 29/0609; G01N 29/22; G01N 2021/8864; G01N 2291/101; G01N 27/90; G01N 27/9006; G01N 2021/8832; G01N 2021/9518; G01N 30/7206; G01N 2021/1772; G01N 2021/4735; G01N 2223/1016; G01N 29/00; G01N 29/275; G01N 29/4463; G01N 19/08; G01N 21/8983; G01N 2201/0634; G01N 23/2273; G01N 29/226; G01N 21/9009; G01N 2291/0421; G01N 2033/0081; G01N 23/046; G01N 27/83; G01N 29/348; G01N 21/1717; G01N 2201/0638; G01N 29/2412; G01N 2021/4711; G01N 2021/887; G01N 2021/945; G01N 21/211; G01N 21/951; G01N 2021/0112; G01N 21/8922; G01N 2291/2638; G01N 2291/2675; G01N 21/6456; G01N 2201/0633; G01N 2201/0697; G01N 2201/103; G01N 2291/0427; G01N 2291/102; G01N 2291/105; G01N 27/9026; G01N 29/26; G01N 33/46; G01N 2021/8874; G01N 21/8921; G01N 29/0654; G01N 2021/1765; G01N 2021/8858; G01N 2021/9511; G01N 21/25; G01N 21/6489; G01N 23/043; G01N 2021/8967; G01N 21/17; G01N 21/894; G01N 21/95692; G01N 2201/0635; G01N 27/20; G01N 29/2437; G01N 29/4427; G01N 33/20; G01N 33/2045; G01N 2021/8896; G01N 21/33; G01N 2201/063; G01N 2201/065; G01N 27/9093; G01N 29/2487; G01N 29/4436; G01N 2021/479; G01N 2201/06; G01N 2201/068; G01N 23/223; G01N 27/72; G01N 29/12; G01N 2021/556; G01N 21/9045; G01N 2201/025; G01N 2201/0612; G01N 2291/015; G01N 2021/95646; G01N 2021/9583; G01N 2223/401; G01N 27/87; G01N 2021/646; G01N 21/15; G01N 2201/0626; G01N 2223/611; G01N 2291/2698; G01N 23/044; G01N 29/44; G01N 3/08; G01N 33/346; G01N 2021/1774; G01N 2021/8411; G01N 2021/8438; G01N 2021/8962; G01N 21/1702; G01N 2201/0245; G01N 2201/06153; G01N 2291/263; G01N 23/00; G01N 23/02; G01N 29/06; G01N 2021/8965; G01N 21/251; G01N 21/31; G01N 21/57; G01N 21/65; G01N 2201/10; G01N 2201/127; G01N 23/16; G01N 2021/889; G01N 21/59; G01N 21/66; G01N 2201/02; G01N 2201/0683; G01N 2203/0282; G01N 2291/014; G01N 2291/02827; G01N 23/2204; G01N 29/4454; G01N 15/06; G01N 2021/8592; G01N 2291/0422; G01N 23/203; G01N 27/9013; G01N 29/42; G01N 29/48; G01N 1/286; G01N 2021/8905; G01N 21/35; G01N 21/45; G01N 21/9018; G01N 2201/06146; G01N 2201/0621; G01N 2223/04; G01N 2291/2623; G01N 27/9073; G01N 2021/6419; G01N 2021/8838; G01N 2021/9063; G01N 21/552; G01N 22/02; G01N 2201/0636; G01N 2201/0637; G01N 2223/419; G01N 2223/6113; G01N 2223/642; G01N 2291/02881; G01N 2291/2626; G01N 29/2493; G01N 1/02; G01N 2001/028;
G01N 21/278; G01N 21/4795; G01N
21/643; G01N 2201/0227; G01N
2201/0415; G01N 2201/104; G01N
2223/03; G01N 2223/652; G01N
2291/2697; G01N 23/20; G01N 29/14;
G01N 29/32; G01N 3/20; G01N 33/025;
G01N 2021/1706; G01N 2021/8636;
G01N 2021/891; G01N 2021/8925; G01N
21/274; G01N 2201/067; G01N
2223/645; G01N 2291/2696; G01N
29/045; G01N 29/38; G01N 1/34; G01N
2021/4709; G01N 2021/5957; G01N
2021/8416; G01N 2021/9563; G01N
21/6428; G01N 2201/0618; G01N
2201/0628; G01N 2201/105; G01N
2223/076; G01N 27/9086; G01N 29/048;
G01N 29/34; G01N 29/343; G01N
29/4409; G01N 3/04; G01N 15/0612;
G01N 15/10; G01N 2021/151; G01N
2021/4707; G01N 2021/8912; G01N
2021/936; G01N 2021/9544; G01N
21/255; G01N 21/77; G01N 2201/064;
G01N 2201/101; G01N 2203/0278; G01N
2223/426; G01N 2223/6116; G01N
2223/6466; G01N 2291/02818; G01N
2291/0423; G01N 2291/103; G01N
2291/2693; G01N 27/80; G01N 29/2456;
G01N 29/50; G01N 33/367; G01N
33/442; G01N 1/04; G01N 1/28; G01N
2001/022; G01N 2021/0106; G01N
2033/0083; G01N 2035/00801; G01N
21/23; G01N 21/49; G01N 2201/0438;
G01N 2201/06126; G01N 2201/0694;
G01N 2201/08; G01N 2203/0067; G01N
2223/309; G01N 2223/505; G01N
2291/0425; G01N 27/22; G01N 29/036;
G01N 29/0681; G01N 29/40; G01N
33/34; G01N 33/54373; G01N 1/22;
G01N 15/02; G01N 15/0656; G01N
2015/0693; G01N 2015/1452; G01N
2021/1776; G01N 2021/4716; G01N
2021/6439; G01N 2033/0078; G01N
21/3151; G01N 21/3581; G01N 21/6447;
G01N 21/8483; G01N 21/8916; G01N
2201/021; G01N 2201/0627; G01N
2203/0248; G01N 2203/0647; G01N
2223/204; G01N 2223/6462; G01N
2291/017; G01N 2291/0228; G01N
2291/0251; G01N 2291/056; G01N
27/85; G01N 29/222; G01N 29/228;
G01N 29/2481; G01N 29/36; G01N
29/4472; G01N 33/38; G01N 5/00; G01N
15/0211; G01N 15/088; G01N
2001/2833; G01N 2015/0846; G01N
2015/144; G01N 2021/1729; G01N
2021/213; G01N 2021/8444; G01N
2021/8928; G01N 21/78; G01N 21/8915;
G01N 22/00; G01N 2201/0614; G01N
2201/1042; G01N 2203/0017; G01N
2203/04; G01N 2223/418; G01N
2291/012; G01N 2291/045; G01N 29/09;
G01N 29/4418; G01N 33/08; G01N
33/208; G01N 33/54386; G01N 1/00;
G01N 1/2813; G01N 15/0227; G01N
17/00; G01N 17/04; G01N 2015/0053;
G01N 2021/0181; G01N 2021/1727;
G01N 2021/1736; G01N 2021/4721;
G01N 2021/4752; G01N 2021/4757;
G01N 2021/8877; G01N 2021/8907;
G01N 21/41; G01N 21/645; G01N
2201/0625; G01N 2201/1085; G01N
2201/117; G01N 2223/30; G01N
2223/3308; G01N 2223/61; G01N
2223/615; G01N 2223/619; G01N
2223/629; G01N 2291/018; G01N
2291/02863; G01N 2291/26; G01N
2291/2695; G01N 23/087; G01N 27/221;
G01N 27/622; G01N 27/76; G01N 30/72;
G01N 33/36; G01N 33/383; G01N 35/00;
G01N 35/00732; G01N 1/2205; G01N
13/02; G01N 15/1468; G01N 17/006;
G01N 17/02; G01N 2001/024; G01N
2021/0143; G01N 2021/1748; G01N
2021/3181; G01N 2021/416; G01N
2021/4704; G01N 2021/4714; G01N
2021/6482; G01N 2021/7786; G01N
2021/8433; G01N 2021/8455; G01N
2021/8819; G01N 2021/8911; G01N
2021/9546; G01N 21/0303; G01N 21/13;
G01N 21/3586; G01N 21/63; G01N
21/648; G01N 21/87; G01N 2201/0407;
G01N 2201/0642; G01N 2201/124; G01N
2203/0023; G01N 2203/0062; G01N
2223/624; G01N 2223/633; G01N
2291/0256; G01N 23/20025; G01N
23/227; G01N 27/205; G01N 27/24;
G01N 29/022; G01N 3/46; G01N 3/56;
G01N 33/02; G01N 1/38; G01N 1/40;
G01N 15/14; G01N 17/008; G01N 19/00;
G01N 2001/2873; G01N 2009/024; G01N
2021/1734; G01N 2021/3155; G01N
2021/4764; G01N 2021/6463; G01N
2021/8405; G01N 2021/8627; G01N
2021/933; G01N 2021/9542; G01N
2021/95669; G01N 2033/0095; G01N
2035/00752; G01N 2035/00762; G01N
21/29; G01N 21/39; G01N 21/4785;
G01N 2201/0224; G01N 2201/04; G01N
2201/0423; G01N 2201/0453; G01N
2201/0655; G01N 2201/066; G01N
2201/0826; G01N 2201/1053; G01N
2201/121; G01N 2201/12753; G01N
2203/0019; G01N 2203/0037; G01N
2203/0041; G01N 2203/0212; G01N
2203/0274; G01N 2203/028; G01N
2203/0658; G01N 2203/0676; G01N
2223/319; G01N 2223/3303; G01N
2223/3305; G01N 2223/42; G01N
2223/623; G01N 2291/0238; G01N
2291/052; G01N 2291/2691; G01N
23/10; G01N 23/2202; G01N 23/2208;
G01N 23/222; G01N 24/08; G01N 25/00;
G01N 25/20; G01N 27/00; G01N 27/02;
G01N 27/3272; G01N 27/61; G01N
27/9053; G01N 27/92; G01N 29/0618;
G01N 29/2406; G01N 3/068; G01N 3/10;
G01N 3/16; G01N 30/88; G01N 33/0004;
G01N 33/15; G01N 33/202; G01N
33/365; G01N 33/44; G01N 33/447;

G01N 35/0099; G01N 35/1067; G01N 9/24; G01N 1/10; G01N 1/14; G01N 1/2258; G01N 1/26; G01N 1/312; G01N 1/32; G01N 1/36; G01N 15/0205; G01N 15/1012; G01N 2001/021; G01N 2001/1031; G01N 2001/2886; G01N 2011/008; G01N 2021/0162; G01N 2021/0187; G01N 2021/0325; G01N 2021/0328; G01N 2021/157; G01N 2021/1782; G01N 2021/218; G01N 2021/3568; G01N 2021/473; G01N 2021/4742; G01N 2021/6471; G01N 2021/6493; G01N 2021/7796; G01N 2021/8609; G01N 2021/8663; G01N 2021/869; G01N 2021/8902; G01N 2021/8904; G01N 2021/95661; G01N 2030/885; G01N 2030/8854; G01N 2033/008; G01N 2033/0091; G01N 2033/105; G01N 2035/00108; G01N 2035/00782; G01N 2035/0091; G01N 2035/046; G01N 21/07; G01N 21/253; G01N 21/314; G01N 21/453; G01N 21/455; G01N 21/534; G01N 21/554; G01N 21/6458; G01N 21/7703; G01N 2201/0216; G01N 2201/0218; G01N 2201/0631; G01N 2201/0632; G01N 2201/0696; G01N 2201/0813; G01N 2201/084; G01N 2201/1045; G01N 2201/1047; G01N 2201/112; G01N 2201/126; G01N 2203/0075; G01N 2203/0078; G01N 2203/0098; G01N 2203/0244; G01N 2203/0286; G01N 2203/0682; G01N 2223/0745; G01N 2223/1013; G01N 2223/106; G01N 2223/304; G01N 2223/305; G01N 2223/306; G01N 2223/60; G01N 2223/6123; G01N 2223/616; G01N 2223/628; G01N 2223/648; G01N 2291/0232; G01N 2291/02466; G01N 2291/0426; G01N 2291/0428; G01N 2291/055; G01N 2291/269; G01N 23/2055; G01N 23/2252; G01N 25/18; G01N 25/4826; G01N 25/4866; G01N 27/025; G01N 27/04; G01N 27/26; G01N 27/307; G01N 27/725; G01N 27/906; G01N 29/0672; G01N 29/2475; G01N 29/341; G01N 29/346; G01N 29/4481; G01N 3/02; G01N 3/12; G01N 3/34; G01N 3/405; G01N 31/226; G01N 33/0009; G01N 33/0022; G01N 33/0027; G01N 33/204; G01N 33/52; G01N 33/533; G01N 33/54326; G01N 33/558; G01N 33/582; G01N 35/00029; G01N 35/00584; G01N 35/00663; G01N 35/04; G01N 37/005; G01N 5/02; G01N 5/04

See application file for complete search history.

(56) References Cited

FOREIGN PATENT DOCUMENTS

| | | | | |
|---|---|---|---|---|
| EP | 1132710 | | 9/2001 | |
| EP | 2781912 A1 | * | 9/2014 | ......... G01N 21/9501 |
| EP | 3076162 A1 | * | 10/2016 | ........... G01B 11/306 |
| JP | H05-346319 | | 12/1993 | |
| JP | H11-148902 | | 6/1999 | |
| JP | H11-264803 | | 9/1999 | |
| JP | 2000-074646 | | 3/2000 | |
| JP | 2007-003332 | | 1/2007 | |
| JP | 2007-033240 | | 2/2007 | |
| JP | 2007-198762 | | 8/2007 | |
| JP | 2009250863 A | * | 10/2009 | |
| JP | 4503690 B1 | * | 7/2010 | ............. B32B 41/00 |
| JP | 2012-194025 | | 10/2012 | |
| JP | 3225922 U | * | 4/2020 | |
| KR | H05346319 A | * | 12/1993 | |
| KR | 20040044410 A | * | 5/2004 | |
| KR | 20090107400 A | * | 10/2009 | |
| KR | 20100094295 A | * | 10/2009 | |
| KR | 101019831 B1 | * | 3/2011 | |
| KR | 20130021877 A | * | 3/2013 | |
| KR | 20180117260 A | * | 10/2018 | |
| WO | WO-0012963 A1 | * | 3/2000 | ......... B28B 17/0081 |
| WO | 02/097410 | | 12/2002 | |
| WO | WO-2012033301 A2 | * | 3/2012 | ......... G01N 21/9503 |
| WO | WO-2013080093 A1 | * | 6/2013 | ......... G01N 21/9501 |
| WO | WO-2014208226 A1 | * | 12/2014 | ............. B32B 13/08 |
| WO | WO-2015052445 A1 | * | 4/2015 | ......... G01N 21/8851 |
| WO | WO-2017147223 A1 | * | 8/2017 | ......... C03B 33/0235 |
| WO | WO-2018012192 A1 | * | 1/2018 | ............ G01N 21/892 |
| WO | WO-2018235376 A1 | * | 12/2018 | ............. G01B 11/30 |
| WO | WO-2022064519 A1 | * | 3/2022 | |

OTHER PUBLICATIONS

International Search Report for PCT/JP2020/003214 dated Apr. 14, 2020.
Written Opinion of the International Searching Authority for PCT/JP2020/003214 dated Apr. 14, 2020.
Office Action dated Nov. 22, 2022 with respect to the corresponding Japanese patent application No. 2021-501782.
Office Action dated Apr. 3, 2023 with respect to the corresponding Singaporean patent application No. 11202107495U.

* cited by examiner

APPARATUS FOR INSPECTING PLATE-LIKE BODIES

TECHNICAL FIELD

The present invention relates to an apparatus for inspecting plate-like bodies.

BACKGROUND ART

Conventionally, plate-like bodies that are plate-like materials have been widely used industrially such as for semiconductor substrates, glass substrates, or surface members for construction such as gypsum boards.

Methods and apparatuses for inspecting surfaces of such plate-like bodies have been studied in order to evaluate defects such as surface cracks, surface flatness, or the like.

For example, Patent document 1 discloses a surface-defect inspecting apparatus for plate-like substrates, and the surface-defect inspecting apparatus includes a conveying mechanism to convey a target substrate to be inspected, across tapered rollers facing each other, where tapered rollers in each roller set are aligned at predetermined intervals in a conveyance direction, such that smaller diameter-side ends of given tapered rollers are opposed to each other, and each detection space is set between given tapered rollers. The surface-defect inspecting apparatus also includes an air floating mechanism disposed in an area corresponding to a predetermined width that is set with respect to a midpoint between given tapered rollers in each roller set, where the air floating mechanism is provided beyond detection spaces. The air floating mechanism floats a middle portion of the conveyed target substrate in the conveyance direction, when the air is ejected from the bottom of the target substrate. Further, the surface-defect inspecting apparatus includes units to optically and continuously detect a surface condition of the target substrate to pass through a given detection space, in a one-dimensional direction perpendicular to the conveyance direction.

CITATION LIST

Patent Document

Patent document 1: Japanese Unexamined Patent Application Publication No. H11-148902

SUMMARY

However, in the surface-defect inspecting apparatus disclosed in Patent document 1, a light source for emission and a one-dimensional CCD camera are disposed above a given target substrate to be conveyed, and a top of the given target substrate is inspected.

Further, although defects such as cracks in one or more side surfaces or corners of plate-like bodies are likely to occur, it may be difficult for the surface-defect inspecting apparatus disclosed in Patent document 1 to suitably inspect one or more side surfaces or corners of a plate-like body. In particular, when a plate-like body, such as a gypsum board, in which coating materials are respectively disposed on top and bottom sides is used, the surface-defect inspecting apparatus disclosed in Patent document 1 cannot perform observation through the top and bottom of the plate-like body, due to the coating materials, and consequently it may be difficult to detect a defect or the like in a given side surface or corner of the plate-like body.

In view of the above problem in the related art, according to one aspect of the present invention, an object of the present invention is to provide an apparatus for inspecting plate-like bodies that can detect a defect of a side surface of a plate-like body in which coating materials are disposed on top and bottom sides.

In order to solve the problem described above, according to one embodiment of the present invention, an apparatus for inspecting plate-like bodies to inspect a side surface of a plate-like body with sheeted coating materials on a top side and bottom side of the plate-like body, is provided. The apparatus includes:

at least one light emitting unit configured to irradiate the side surface of the plate-like body with light;

at least one light receiving unit configured to receive light reflected with respect to the side surface of the plate-like body;

a conveying unit configured to move at least one among the light emitting unit and the plate-like body and to vary a position of the light on the side surface of the plate-like body, emitted by the light emitting unit; and a determining unit configured to determine whether the side surface of the plate-like body has a defect, by using the light emitted by the light emitting unit, upon occurrence of a condition under which the conveying unit varies the position of the light, on the side surface of the plate-like body, emitted by the light emitting unit.

Advantageous Effects of Invention

According to one embodiment of the present invention, an apparatus for inspecting plate-like bodies that can detect a defect of a side surface of a plate-like body in which coating materials are disposed on top and bottom sides, can be provided.

DESCRIPTION OF EMBODIMENTS

Embodiments of the present invention will be described below with reference to the drawings. The present invention is not limited to the embodiments below, and various modifications and substitutions to the embodiments can be made without departing from a scope of the present invention.

[Apparatus for Inspecting Plate-Like Bodies]

One example of the configuration of an apparatus for inspecting plate-like bodies according to the present embodiment will be described.

The apparatus for inspecting plate-like bodies according to the present embodiment relates to an apparatus for inspecting plate-like bodies to inspect a side surface of a plate-like body with coating materials disposed on a top side and bottom side of the plate-like body. Such an apparatus can include the following members.

At least one light emitting unit configured to irradiate a side surface of a plate-like body with light.

At least one light receiving unit configured to receive light reflected with respect to a side surface of a plate-like body.

A conveying unit configured to move at least one among a light emitting unit and a plate-like body and to vary a position of light, on a side surface of the plate-like body, emitted by a light emitting unit.

A determining unit configured to determine whether a side surface of a plate-like body has a defect, by using light emitted by a light emitting unit, upon occurrence of a condition under which a conveying unit varies a position of light, on the side surface of the plate-like body, emitted by the light emitting unit.

First, an example of the configuration of the plate-like body to be able to be suitably used for the apparatus for inspecting plate-like bodies according to the present embodiment will be described.

Figure 1:
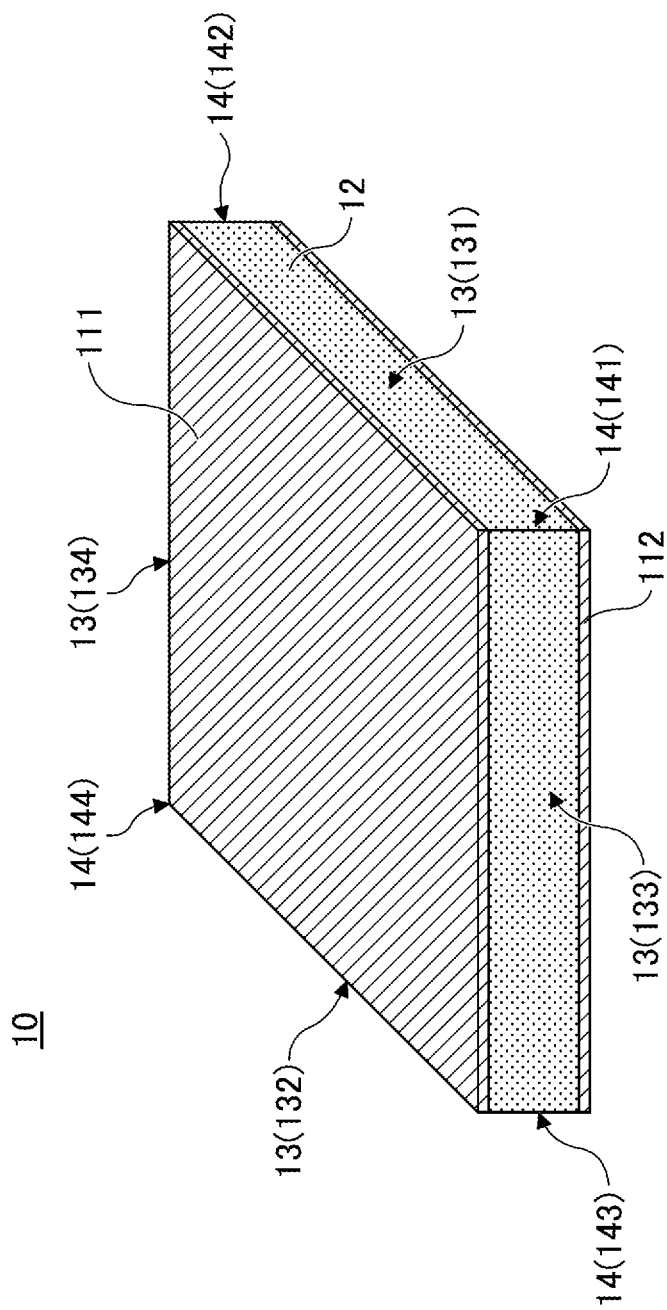
FIG. 1 is a diagram for describing a plate-like body to be able to be suitably used for an apparatus for inspecting plate-like bodies according to one or more embodiments of the present invention.

As illustrated in FIG. 1, a plate-like body 10 can be plate-shaped. The plate-like body 10 can have sheeted coating materials 111 and 112 that are respectively provided on a top and bottom of the plate-like body. The plate-like body 10 can have a core 12 between the sheeted coating materials 111 and 112.

Note that in FIG. 1, the example in which the sheeted coating materials 111 and 112 are disposed on the top and bottom of the core 12, is illustrated. However, the example is not limited to such a manner, and at least a portion of each of the sheeted coating materials 111 and 112 may be disposed so as to be embedded in the core 12. Further, the sheeted coating materials 111 and 112 need not be included in an end product. The sheeted coating materials are sufficient as long as they are disposed when detection is performed using the apparatus for inspecting plate-like bodies according to the present embodiment. In such a manner, each of the sheeted coating materials 111 and 112 includes a protective sheet or the like to be disposed for surface protection in a manufacturing process.

The plate-like body 10 has side surfaces 13. In the case of the plate-like body 10 illustrated in FIG. 1, the side surfaces 13 include a first side surface 131, a second side surface 132 located opposite the first side surface 131, a third side surface 133, and a fourth side surface 134 located opposite the third side surface 133.

Further, corners 14 are provided at both edges of a given side surface 13 in a longitudinal direction (width direction) thereof. Specifically, for example, a first corner 141, a second corner 142, a third corner 143, and a fourth corner 144 can be provided.

Note that in FIG. 1, the example of the plate-like body 10 having a cuboid shape is illustrated. However, as long as the plate-like shape is formed, the shape of the plate-like body 10 is not limited to the manner described above.

As described above, when the sheeted coating members 111 and 112 are respectively disposed on the top and bottom sides of the plate-like body 10, and the plate-like body 10 is plate-shaped, types of the plate-like body 10 are not particularly restricted. For example, the types of the plate-like body 10 include various building face materials, and the like. One or more plate-like bodies 10 include one or more types selected from among, for example, a glass mat gypsum board, a gypsum board containing a non-woven gypsum fiberglass fabric, a gypsum board specified by JIS A 6901 (2014), a gypsum board that is lighter or heavier than a gypsum board specified by JIS A 6901 (2014) (hereinafter, a given gypsum board specified by JIS, and a given gypsum board that is lighter or heavier than a gypsum board specified by JIS are collectively referred to as "gypsum boards"), and the like.

The size of the plate-like body 10 is not particularly restricted, and can be set to any size. When the plate-like body 10 is a gypsum board, the thickness of the gypsum board preferably complies with the standards specified by JIS A 6901 (2014).

When the standards specified by JIS A 6901 (2014) are met, it means that the thickness of the plate-like body 10 is within any range among a range between 9.5 mm and 10.0 mm, a range between 12.5 mm and 13.0 mm, a range between 15.0 mm and 15.5 mm, a range between 16.0 mm and 16.5 mm, a range between 18.0 mm and 18.5 mm, a range between 21.0 mm and 21.5 mm, and a range between 25.0 mm and 25.5 mm.

First Embodiment

Figure 2:
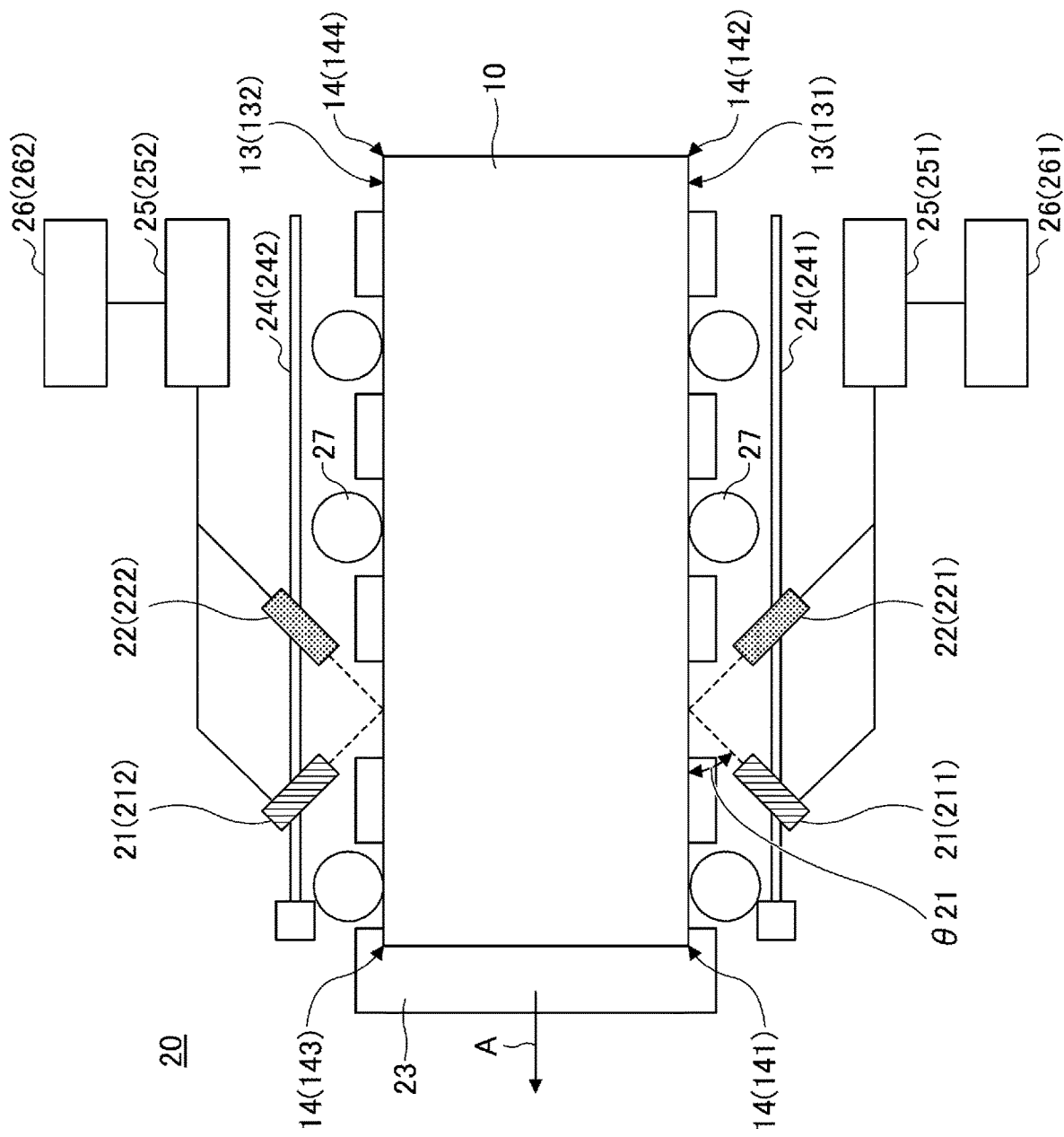
FIG. 2 is a diagram for describing an example of the configuration of the apparatus for inspecting plate-like bodies according to a first embodiment of the present invention.

Hereafter, an example of the configuration of the apparatus for inspecting plate-like bodies according to the present embodiment will be described with reference to FIG. 2. FIG. 2 is a top view of an apparatus 20 for inspecting plate-like bodies according to the present embodiment.

As illustrated in FIG. 2, the apparatus 20 for inspecting plate-like bodies according to the present embodiment can include light emitting units 21 each of which irradiates a given side surface 13 of the plate-like body 10 with light, and can include light receiving units 22 each of which receives light reflected with respect to a given side surface 13 of the plate-like body 10.

The configuration of each light emitting unit 21 is not particularly restricted. As the light emitting units 21, various light emitting units each of which emits light having a wavelength and intensity to allow the light to be reflected with respect to a given side surface 13 of the plate-like body 10, can be used. That is, the various light emitting units can be adopted as the light emitting units 21. Note, however, that in particular, intensity of light to be emitted by each light emitting unit 21 is preferably increased in order to detect defects accurately. For example, a laser oscillator such as a semiconductor laser can be used as each light emitting unit 21.

As described above, the wavelength of light to be emitted by each light emitting unit 21 is not particularly restricted. For example, as such light, light of any wavelength, among an ultraviolet range, a visible range, and an infrared range, may be used. From the viewpoint of reducing the energy required for detection and performing measurement accurately, infrared light is preferably used as light to be emitted by the light emitting unit 21.

The configuration of each light receiving unit 22 is not particularly restricted. As long as each light receiving unit 22 can receive light that is emitted by a given light emitting unit 21 and that is reflected with respect to a given side surface 13 of the plate-like body 10, it is sufficient. In such a manner, the configuration of each light receiving unit 22 can be selected based on a given wavelength of light to be emitted by a given light emitting unit 21, an evaluation index used in a determining unit, as described below, or the like. One or more light receiving units 22 can include one or more types of light receiving elements selected from among, for example, a photoelectric tube, a photomultiplier, a phototransistor, a photodiode, a photoconductive cell, an image sensor, a thermocouple for radiation, a thermopile, and the like.

Note that in FIG. 2, although a given light emitting unit 21 and a given light receiving unit 22 are illustrated as separate members, the given light emitting unit 21 and the given light receiving unit 22 can be also used as a single member in which the given light emitting unit 21 and the given light receiving unit 22 are integrated.

A position of light, on a given side surface 13 of the plate-like body 10, to be emitted by each light emitting unit 21 is not particularly restricted. In this regard, in general, when a given side surface 13 of the plate-like body 10 has a defect, a middle portion of the given side surface 13 of the plate-like body 10 in a thickness direction thereof also has a defect. In light of the point described above, a given light emitting unit 21 preferably emits light so as to cover the middle portion of a given side surface of a given plate-like body in the thickness direction thereof, for example.

The shape of light on a given side surface 13 of the plate-like body 10 to be emitted by a given emitting unit 21 is not particularly restricted. For example, linear light on a given side surface 13 of the plate-like body 10 along the thickness direction thereof, or circular light can be set.

Note that an angle θ21 set between a path of light emitted by a given light emitting unit 21, toward a given side surface 13 of the plate-like body 10, as represented by the dashed line in FIG. 2, and the given side surface 13 of the plate-like body 10, is not particularly restricted, and the angle can be adjusted under a condition or the like under which measurement is performed using light emitted by the given light emitting unit 21. For example, such an angle is preferably given by 30°≤θ21≤150°, more preferably 45°≤θ21≤135°, and even more preferably 75°≤θ21≤105°.

In such a manner, when the position of light, on a given side surface 13 of the plate-like body 10, emitted by a given light emitting unit 21 varies, a defect of the given side surface 13 of the plate-like body 10 can be detected. Specifically, for example, the position of light emitted by a given light emitting unit 21 can be varied along the longitudinal direction (width direction) of the first side surface 131 or the second side surface 132, among the side surfaces 13 of the plate-like body. In other words, scanning can be performed. In this case, for example, by varying the position where a given light emitting unit 21 emits light, from the first corner 141 that is provided at one edge of the first side surface 131, to the second corner 142 that is at another edge thereof, the entire first side surface 131 can be inspected. For example, by varying the position where a given light emitting unit 21 emits light, from the third corner 143 that is provided at one edge of the second side surface 132, to the fourth corner 144 that is at another edge thereof, the entire second side surface 132 can be inspected.

In such a manner, the apparatus 20 for inspecting plate-like bodies according to the present embodiment can include one or more conveying units to move at least one among the light emitting units 21 and a given plate-like body 10 to thereby vary the position of light on a given side surface 13 of the plate-like body 10, emitted by a given light emitting unit 21.

An example of a given conveying unit includes a conveying unit 23 for conveying the plate-like body 10. One or more conveying units 23 for conveying the plate-like body 10 can include one or more types selected from among, for example, a roll conveyor illustrated in FIG. 2, a belt conveyor, a chain conveyor, and the like. The conveying unit 23 can convey the plate-like body 10 in a direction expressed by the arrow A illustrated in FIG. 2, or a direction opposite the direction expressed by the arrow A.

Note that the one or more conveying units for conveying the plate-like body 10 is not limited to being one type. For example, a combination of two or more types of units such as a combination of a roll conveyor and a belt conveyor can be also used depending on installation locations of one or more conveying units.

Given conveying units include conveying units 24 each of which conveys a given light emitting unit 21. One or more conveying units for conveying a given light emitting unit 21 can include a combination of one or more types of sliders, selected from among a linear rail (linear guide), a linear shaft, and the like, and one or more types of drive units selected from among a linear bush, a linear motor, a motor, and the like. Note that a fixed positional relationship between a given light emitting unit 21 and a given light receiving unit 22 is preferably maintained, and thus, when each conveying unit 24 for conveying a given light emitting unit 21 is provided, a conveying unit for conveying a given light receiving unit 22 can be also provided accordingly. Each conveying unit 24 for conveying a given light emitting unit 21 can also convey a given light receiving unit 22, as well as the given light emitting unit 21.

In such a manner, when one or more conveying units are provided, and at least one among a given light emitting unit 21 and the plate-like body 10 is moved to thereby vary, along the longitudinal direction of the plate-like body 10, a given position of light on a given side surface 13 of the plate-like body 10 emitted by a given light emitting unit 21, the given side surface 13 of the plate-like body 10 can be inspected.

The apparatus 20 for inspecting plate-like bodies according to the present embodiment can include determining units 26 each of which determines whether a given side surface 13 of the plate-like body 10 has a defect. When a given convey unit varies, along the longitudinal direction of a given side surface 13, a given position of light on a given side surface 13 of the plate-like body 10 emitted by a given emitting unit 21, a given determining unit 26 can determine whether the given side surface 13 of the plate-like body 10 has a defect by using the light emitted by the given light emitting unit 21.

A determining method by each determining unit 26 is not particularly restricted. Such a determination can be more specifically performed using light that a given light emitting unit 22 emits, as well as light reflected with respect to a given side surface 13 of the plate-like body 10.

Further, for example, the apparatus 20 for inspecting plate-like bodies according to the present embodiment can also include distance calculating units 25 each of which calculates a distance between a given light emitting unit 21 and a given side surface 13, by using light emitted by the given light emitting unit 21.

A specific method of measuring, by each distance calculating unit 25, a distance between a given light emitting unit 21 and a given side surface 13 of the plate-like body 10 is not particularly restricted, and measurement can be performed by, for example, triangulation used in a laser distance measuring instrument, a time-of-flight system (phase difference distance measuring system or pulse modulation system), or the like.

In this case, each determining unit 26 can determine whether a given side surface 13 of the plate-like body 10 has a defect based on a distance between a given light emitting unit 21 and a given side surface 13 of the plate-like body 10, where the distance is calculated by a given distance calculating unit 25.

When a given position of light on a given side surface 13, emitted by a given light emitting unit 21 is moved along the longitudinal direction of the given side surface 13, in a case where the given side surface 13 has a defect and thus a recess is formed in the given side surface 13, a longer distance, with respect to the formed recess, between the given light emitting unit 21 and the given side surface 13 of the plate-like body 10 is set in comparison to other portions. In such a manner, for example, a given determining unit 26 can determine and detect that a recess, that is, a defect is formed in a portion for which the longer distance is set in comparison to other portions, or a portion for which a given distance is greater than a predefined distance.

Note that as described with reference to FIG. 1, the plate-like body 10 has multiple side surfaces 13. In such a manner, multiple light emitting units 21, multiple light receiving units 22, and the like can be provided in order to allow for simultaneous inspection of the side surfaces 13.

Specifically, for example, as illustrated in FIG. 2, the apparatus 20 for inspecting plate-like bodies according to the present embodiment can include a first light emitting unit 211 and a second light emitting unit 212, which are light emitting units 21. The apparatus 20 for inspecting plate-like bodies according to the present embodiment can also include a first light receiving unit 221 and a second light receiving unit 222, which are light receiving units 22.

The first light emitting unit 211 and the first light receiving unit 221 can be disposed on the side of the first side surface 131 of the plate-like body 10. Further, the second light emitting unit 212 and the second light receiving unit 222 can be disposed on the side of the second side surface 132 located opposite the first side surface 131 of the plate-like body 10.

In this case, a given distance calculating unit 25 can calculate a first distance, which is a distance between the first light emitting unit 211 and the first side surface 131, by using light that the first light emitting unit 211 emits. Further, a given distance calculating unit 25 can calculate a second distance, which is a distance between the second light emitting unit 212 and the second side surface 132, by using light that the second light emitting unit 212 emits.

A given determining unit 26 can determine whether the first side surface 131 has a defect based on the first distance. Also, a given determining unit 26 can determine whether the second side surface 132 has a defect based on the second distance. Specifically, for example, each determining unit 26 can determine that a recess, that is, a defect is present in a given side surface among the first side surface 131 and the second side surface 132, with respect to a portion for which a given distance among the first distance and second distance is increased in comparison to distances for other portions, or a given portion for which a given distance exceeds a predefined value.

Note that for distance calculating units 25, a first distance calculating unit 251 and a second distance calculating unit 252 can be separately provided, and for determining units 26, a first determining unit 261 and a second determining unit 262 can be separately provided. However, such a manner is not limiting, and a single distance calculating unit 25 and a single determining unit 26 can perform processing with respect to the first side surface 131 and the second side surface 132.

As described above, when the first light emitting unit 211 and the second light emitting unit 212 are provided, and such light emitting units 21 are conveyed, a conveying unit 241 for the first light emitting unit, and a conveying unit 242 for the second light emitting unit can be provided accordingly.

In the apparatus for inspecting plate-like bodies according to the present embodiment, a fixed distance between a given light emitting unit 21 and a given side surface 13 of the plate-like body 10 where light is emitted by the given light emitting unit, is preferably maintained. In such a manner, the apparatus 20 for inspecting plate-like bodies according to the present embodiment can further include one or more side position adjusters 27 each of which adjusts a position where a given side surface 13 of the plate-like body 10 is set, in order to place the given side surface 13 of the plate-like body 10 at a predetermined location.

A specific configuration of each side position adjuster 27 is not particularly restricted. For example, when the plate-like body 10 is conveyed by the conveying unit 23, multiple rods can be each disposed along a conveyance path to be used in the conveying unit 23, so as to come into contact with a given side surface 13 of the plate-like body 10, as illustrated in FIG. 2. Note that in FIG. 2, an example in which central axes of multiple cylindrical rods are arranged parallel to given side surfaces 13 of the plate-like body 10, is illustrated. By disposing such rods, a conveyed plate-like body 10 is guided by the multiple rods and thus is located between given rods.

Note that the configuration of each side position adjuster 27 is not limited to the manner described above. For example, one or more guiding members may be provided along a conveyed direction of the plate-like body 10 such that a given side surface 13 of the plate-like body 10 is set at a predetermined position.

As the configuration of each side position adjuster 27, a mark is provided and thus a given plate-like body 10 can be located to correspond to one or more given marks.

Second Embodiment

Figure 3:
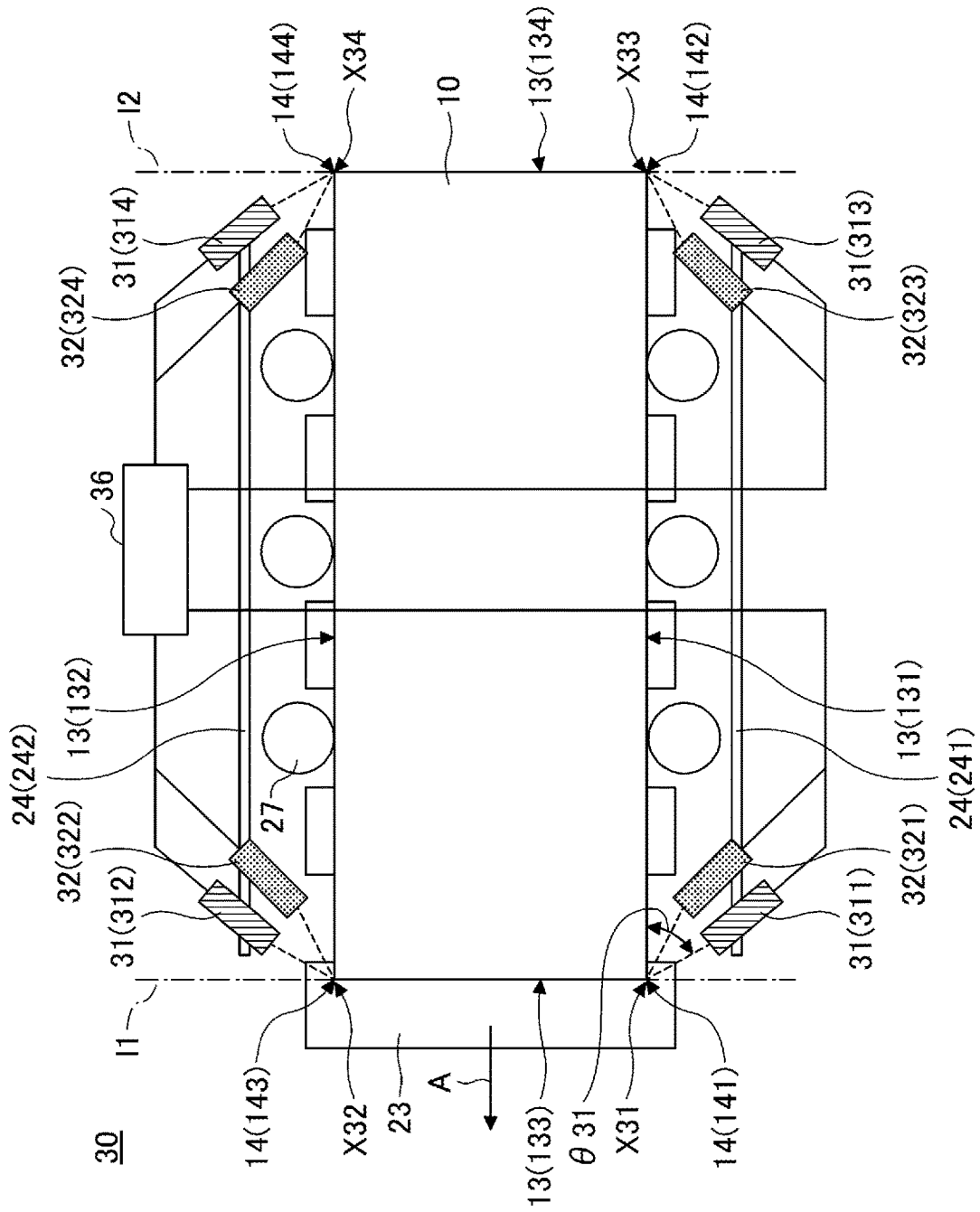
FIG. 3 is a diagram for describing an example of the configuration of the apparatus for inspecting plate-like bodies according to a second embodiment of the present invention.

Hereafter, an example of another configuration of the apparatus for inspecting plate-like bodies according to the present embodiment will be described with reference to FIG. 3. FIG. 3 is a top view of an apparatus 30 for inspecting plate-like bodies according to the present embodiment.

As illustrated in FIG. 3, the apparatus 30 for inspecting plate-like bodies according to the present embodiment can include light emitting units 31, each of which irradiates a given side surface 13 of the plate-like body 10 with light, and can include light receiving units 32, each of which receives light reflected with respect to a given side surface 13 of the plate-like body 10. Note that the light emitting units 31 and the light receiving units 32 are not particularly restricted. For example, for each of the light emitting units 31 and the light receiving units 32, the same unit as that described in the first embodiment can be used, and description for those units will be omitted. For other members, the same members as those described in the first embodiment are denoted by the same number, and description for those members will be partially omitted.

The apparatus 30 for inspecting plate-like bodies according to the present embodiment can include a light emitting unit 311 for first edge detection, and a light emitting unit 312 for second edge detection, which are light emitting units 31, and can include a light receiving unit 321 for first edge detection, and a light receiving unit 322 for second edge detection, which are light receiving units 32.

The light emitting unit 311 for first edge detection, and the light receiving unit 321 for first edge detection can be disposed on the side of the first side surface 131 of the plate-like body 10.

The light emitting unit 312 for second edge detection, and the light receiving unit 322 for second edge detection can be disposed on the side of the second side surface 132 located on the side opposite the first side surface 131.

In this case, each member can be disposed such that a straight line 11 illustrated in the figure is parallel to a third side surface 133 positioned between the first side surface 131 and the second side surface 132 of the plate-like body 10. Note that the straight line 11 means a straight line connecting a position X31 of light on the first side surface 131 to be emitted by the light emitting unit 311 for first edge detection, and a position X32 of light on the second side surface 132 to be emitted by the light emitting unit 312 for second edge detection.

Here, a given conveying unit moves, along the longitudinal direction of the first side surface 131, a given position of light on the first side surface 131, emitted by the light emitting unit 311 for first edge detection, as well as moving, along the longitudinal direction of the second side surface 132, a given position of light on the second side surface 132, emitted by the light emitting unit 312 for second edge detection, where each position of the light includes a position at a given edge of the third side surface 133.

In this case, if a time point at which the light receiving unit 321 for first edge detecting starts receiving light, and a time point at which the light receiving unit 322 for second edge detection starts receiving light do not match, or when a time point at which the light receiving unit 321 for first edge detection terminates receiving light, and a time point at which the light receiving unit 322 for second edge detection terminates receiving light do not match, a determining unit 36 can determine that there is a defect at a given longitudinal edge of the third side surface of a given plate-like body.

If a time point at which the light receiving unit 321 for first edge detecting starts receiving light, and a time point at which the light receiving unit 322 for second edge detection starts receiving light match, or when a time point at which the light receiving unit 321 for first edge detection terminates receiving light, and a time point at which the light receiving unit 322 for second edge detection terminates receiving light match, the determining unit 36 can determine that there is no defect at corners that are longitudinal edges of the third side surface 133 of a given plate-like body.

In the apparatus 30 for inspecting plate-like bodies according to the present embodiment, the straight line 11, connecting the position X31 of light on the first side surface 131 emitted by the light emitting unit 311 for first edge detection, and the position X32 of the light on the second side surface 132 emitted by the light emitting unit 312 for second edge detection, is set so as to be parallel to the third side surface 133. In such a manner, when the plate-like body 10 is disposed with respect to the positions X31 and X32, light emitted by each of the light emitting unit 311 for first edge detection and the light emitting unit 312 for second edge detection is reflected with respect to a given side surface among the first side surface 131 and the second side surface 132 of the plate-like body 10, and then a given light receiving unit, among the light receiving unit 321 for first edge detection and the light receiving unit 322 for second edge detection, receives the reflected light. In contrast, when the plate-like body 10 is not disposed with respect to the positions X31 and X32, light emitted by each of the light emitting unit 311 for first edge detection and the light emitting unit 312 for second edge detection is not reflected with respect to a given side surface 13, and thus the light receiving unit 321 for first edge detection or the light receiving unit 322 for second edge detection fails to receive light. Note that when there is a crack at the first corner 141 or the third corner 143 that is a given longitudinal edge of the third side surface 133 of a given plate-like body, and thus light is emitted to a cracked portion, the light is not reflected. Thus, the light receiving unit 321 for first edge detection or the light receiving unit 322 for second edge detection fails to receive light.

In such a manner, when there is no crack at each of the first corner 141 and the third corner 143, which is a given longitudinal edge of the third side surface 133 of the plate-like body 10, while the third side surface 133 of the plate-like body 10 passes through the straight line 11, both of the light receiving unit 321 for first edge detection and the light receiving unit 322 for second edge detection start or terminate receiving light simultaneously. In contrast, when there is a crack or the like at the first corner 141 or the third corner 143, in a case where the third side surface 133 of the plate-like body 10 passes through the straight line 11, times, that is, timings at which the light receiving unit 321 for first edge detection and the light receiving unit 322 for second edge detection start or terminate receiving light differ.

In such a manner, for example, a given conveying unit moves, along the longitudinal direction of the first side surface 131, a given position of light on the first side surface 131 emitted by the light emitting unit 311 for first edge detection, as well as moving, along the longitudinal direction of the second side surface 132, a given position of light on the second side surface 132 emitted by the light emitting unit 312 for second edge detection, where each given position of the light includes a position at a given longitudinal edge of the third side surface. In such a case, based on timings at which the light receiving unit 321 for first edge detection and the light receiving unit 322 for second edge detection start or terminate receiving light, the determining unit 36 can detect whether there is a crack at each of the first corner 141 and the third corner 143 that is a given longitudinal edge of the third side surface 133.

Note that from the viewpoint of sensor accuracy or the like, the timings at which the light receiving unit 321 for first edge detection and the light receiving unit 322 for second edge detection receive light can be each set in consideration of a predetermined tolerance. In this regard, "matching" used in the determination by the determining unit 36 should not be strictly interpreted. For example, when a time point at which the light receiving unit 321 for first edge detection starts receiving light and a time point at which the light receiving unit 322 for second edge detection starts receiving light differ in excess of a predetermined range, or when a time point at which the light receiving unit 321 for first edge detection terminates receiving light and a time point at which the light receiving unit 322 for second edge detection terminates receiving light differ in excess of a predetermined range, it can be determined that there is a crack at a given edge that is a given longitudinal edge of the third side surface of the plate-like body.

For example, when the conveying unit 23 conveys the plate-like body 10, from the right side in FIG. 3 toward the direction expressed by the arrow A, in a case where the third side surface 133 of the plate-like body 10 passes through the straight line 11, a state in which the plate-like body 10 is yet to be disposed with respect to the positions X31 and X32 changes to a disposed state of the plate-like body 10 with respect to the positions. Thus, in this case, after the third side surface 133 of the plate-like body 10 passes through the straight line 11, the light receiving unit 321 for first edge detection, and the light receiving unit 322 for second edge detection start receiving light.

In contrast, for example, when the conveying unit 23 conveys the plate-like body 10, from the right side in FIG. 3 toward a direction opposite the direction expressed by the arrow A, in the case where the third side surface 133 of the plate-like body 10 passes through the straight line 11, a state in which the plate-like body 10 is disposed with respect to the positions X31 and X32 changes to a state in which the plate-like body 10 fails to be disposed with respect to the positions. Thus, in this case, after the third side surface 133 of the plate-like body 10 passes through the straight line 11, the light receiving unit 321 for first edge detection, and the light receiver 322 for second edge detection terminate receiving the light.

Accordingly, as described above, when the timings at which the light receiving unit 321 for first edge detection and the light receiving unit 322 for second edge detection start or terminate receiving light can be each observed based on a moving direction of the position of light, on a given side surface among the first side surface 131 and the second side surface 132, emitted by a given light emitting unit among the light emitting unit 311 for first edge detection and the light emitting unit 312 for second edge detection, it can be determined whether there is a crack at each given longitudinal edge of the third side surface 133.

An angle θ31 set between an optical path of light emitted by the light emitting unit 311 for first edge detection, toward the first side surface 131 of the plate-like body 10, as expressed by the dashed line in FIG. 3, and the first side surface 131 of the plate-like body 10, is not particularly restricted. For example, the angle can be adjusted such that light from the light emitting unit 311 for first edge detection is reflected with respect to a surface of the first side surface 131 and such that a crack or the like can be detected. For example, the angle is preferably given by $30° \leq \theta 31 \leq 150°$, more preferably $45° \leq \theta 31 \leq 135°$, and even more preferably $75° \leq \theta 31 \leq 105°$. In this description, the light emitting unit 311 for first edge detection is described. However, as in the light emitting unit 311 for first edge detection, other light emitting units for an edge detection can be each configured under a condition such as an angle set between an optical path of light emitted by the light emitting unit 312 for second edge detection, toward the second side surface 132 of the plate-like body 10, and the second side surface 132 of the plate-like body 10.

Note that when the third side surface 133 and the fourth side surface 134 are parallel to each other, scanning is entirely performed with respect to each of the third side surface and the fourth side surface, where the position X31 of light on the first side surface 131 emitted by the light emitting unit 311 for first edge detection is moved along the longitudinal direction of the first side surface, as well as moving, along the longitudinal direction of the second side surface, the position X32 of light on the second side surface 132 emitted by the light emitting unit 312 for second edge detection. In such a manner, it can be determined whether there is a crack at each of the second corner 142 and the fourth corner 144, which is a longitudinal edge of the fourth side surface 134.

Note, however, that when the third side surface 133 and the fourth side surface 134 are not parallel, when it is necessary to simultaneously evaluate the presence or absence of a crack at a given longitudinal edge of the fourth side surface 134, or other case, the apparatus 30 for inspecting plate-like bodies according to the present embodiment can further have the following configuration.

In this case, further, the apparatus 30 for inspecting plate-like bodies according to the present embodiment can include a light emitting unit 313 for third edge detection and a light emitting unit 314 for fourth edge detection, which are light emitting units 31. The apparatus 30 can also include a light receiving unit 323 for third edge detection, and a light receiving unit 324 for fourth edge detection, which are light receiving units 32.

The light emitting unit 313 for third edge detection, and the light receiving unit 323 for third edge detection can be disposed on the side of the first side surface 131.

The light emitting unit 314 for fourth edge detection, and the light receiving unit 324 for fourth edge detection can be disposed on the side of the second side surface 132.

In this case, each member can be disposed such that a straight line 12 illustrated in the figure is parallel to a fourth side surface 134 opposite the third side surface 133 of the plate-like body 10. Note that the straight line 12 means a straight line, connecting a position X33 of light on the first side surface 131 emitted by the light emitting unit 313 for third edge detection, and a position X34 of light on the second side surface 132 emitted by the light emitting unit 314 for fourth edge detection.

Here, a given conveying unit moves, along the longitudinal direction of the first side surface 131, a given position of light on the first side surface 131 emitted by the light emitting unit 313 for third edge detection, as well as moving, along the longitudinal direction of the second side surface 132, a given position of light on the second side surface 132 emitted by the light emitting unit 314 for fourth edge detection, where each given position of the light includes a position at a given edge of the fourth side surface 134 of the plate-like body.

In this case, when a time point at which the light receiving unit 323 for third edge detecting starts receiving light, and a time point at which the light receiving unit 324 for fourth edge detection starts receiving light do not match, or when a time point at which the light receiving unit 323 for third edge detection terminates receiving light, and a time point at which the light receiving unit 324 for fourth edge detection terminates receiving light do not match, the determining unit 36 can determine that there is a crack, at a given longitudinal edge of the fourth side surface 134 of the plate-like body 10.

When a time point at which the light receiving unit 323 for third edge detecting starts receiving light, and a time point at which the light receiving unit 324 for fourth edge detection starts receiving light match, or when a time point at which the light receiving unit 323 for third edge detection terminates receiving light, and a time point at which the light receiving unit 324 for fourth edge detection terminates receiving light match, the determining unit 36 can determine that there is no crack at each given corner that is a longitudinal edge of the fourth side surface 134 of the plate-like body 10.

In the apparatus 30 for inspecting plate-like bodies according to the present embodiment, the straight line 12, connecting the position X33 of light on the first side surface 131 emitted by the light emitting unit 313 for third edge detection, and the position X34 of the light on the second side surface 132 emitted by the light emitting unit 314 for fourth edge detection, is set so as to be parallel to the fourth side surface 134. When the plate-like body 10 is disposed with respect to the positions X33 and X34, light emitted by each of the light emitting unit 313 for third edge detection and the light emitting unit 314 for fourth edge detection is reflected with respect to a given side surface among the first side surface 131 and the second side surface 132 of the plate-like body 10, and then a given light receiving unit, among the light receiving unit 323 for third edge detection and the light receiving unit 324 for fourth edge detection, receives the reflected light. In contrast, when the plate-like body 10 is not disposed with respect to the positions X33 and X34, light emitted by each of the light emitting unit 313 for third edge detection and the light emitting unit 314 for fourth edge detection is not reflected with respect to a given side surface 13, and thus the light receiving unit 323 for third edge detection, and the light receiving unit 324 for fourth edge detection fail to receive light. Note that when there is a crack at the second corner 142 or the fourth corner 144, which is a given longitudinal edge of the fourth side surface 134 of the plate-like body, and thus light is emitted to a cracked portion, the light is not reflected. Thus, each of the light receiving unit 323 for third edge detection, and the light receiving unit 324 for fourth edge detection fails to receive light.

In such a manner, when there is no crack at each of the second corner 142 and the fourth corner 144, which is a longitudinal edge of the fourth side surface 134 of the plate-like body 10, while the fourth side surface 134 of the plate-like body 10 passes through the straight line 12, both of the light receiving unit 323 for third edge detection and the light receiving unit 324 for fourth edge detection start or terminate receiving light simultaneously. In contrast, when there is a crack or the like at the second corner 142 or the fourth corner 144, while the fourth side surface 134 of the plate-like body 10 passes through the straight line 12, times, that is, timings at which the light receiving unit 323 for third edge detection and the light receiving unit 324 for fourth edge detection start or terminate receiving light differ. As described above, the determining unit 36 can detect the presence or absence of a crack at a given longitudinal edge of the fourth side surface, based on the timings at which the light receiving unit 323 for third edge detection and the light receiving unit 324 for fourth edge detection start receiving light.

Note that from the viewpoint of sensor accuracy or the like, the timings at which the light receiving unit 323 for third edge detection and the light receiving unit 324 for fourth edge detection receive light can be each set in consideration of a predetermined tolerance. In this regard, "matching" used in the determination by the determining unit 36 should not be strictly interpreted. For example, when a time point at which the light receiving unit 323 for third edge detection starts receiving light, and a time point at which the light receiving unit 324 for fourth edge detection starts receiving light differ in excess of a predetermined range, or when a time point at which the light receiving unit 323 for third edge detection terminates receiving light, and a time point at which the light receiving unit 324 for fourth edge detection terminates receiving light differ in excess of a predetermined range, it can be determined that there is a crack at a given longitudinal edge of the fourth side surface of the plate-like body.

For example, when the conveying unit 23 conveys the plate-like body 10, from the right side in FIG. 3 toward the direction expressed by the arrow A, in a case where the fourth side surface 134 of the plate-like body 10 passes through the straight line 12, a state in which the plate-like body 10 is disposed with respect to the positions X33 and X34 changes to a state in which the plate-like body 10 fails to be disposed with respect to the positions. Thus, in this case, after the fourth side surface 134 of the plate-like body 10 passes through the straight line 12, the light receiving unit 323 for third edge detection and the light receiving unit 324 for fourth edge detection terminate receiving the light.

In contrast, for example, when the conveying unit 23 conveys the plate-like body 10, from the right side in FIG. 3 toward the direction opposite the direction expressed by the arrow A, in the case where the fourth side surface 134 of the plate-like body 10 passes through the straight line 12, a state in which the plate-like body 10 is yet to be disposed with respect to the positions X33 and X34 changes to a disposed state of the plate-like body 10 with respect to the positions. Thus, in this case, after the fourth side surface 134 of the plate-like body 10 passes through the straight line 12, the light receiving unit 323 for third edge detection, and the light receiving unit 324 for fourth edge detection start receiving light.

Accordingly, as described above, when the timings at which the light receiving unit 323 for third edge detection and the light receiving unit 324 for fourth edge detection start or terminate receiving light can be each observed based on a moving direction of the position of light, on a given side surface among the first side surface 131 and the second side surface 132, emitted by a given light emitting unit among the light emitting unit 313 for third edge detection and the light emitter 314 for fourth edge detection, it can be determined whether there is a crack at a given longitudinal edge of the fourth side surface 134.

In FIG. 3, an example in which one determining unit 36 is provided is illustrated, but is not limited to such a manner. For example, a first determining unit and a second determining unit are separately provided, and the light emitting unit 311 for first edge detection, the light emitting unit 312 for second edge detection, the light receiving unit 321 for first edge detection, the light receiving unit 322 for second edge detection, and the like can be each connected to the first determining unit. In this case, for example, the light emitting unit 313 for third edge detection, the light emitting unit 314 for fourth edge detection, the light receiving unit 323 for third edge detection, the light receiving unit 324 for fourth edge detection, and the like can be also each connected to the second, determining unit.

Third Embodiment

Figure 4:
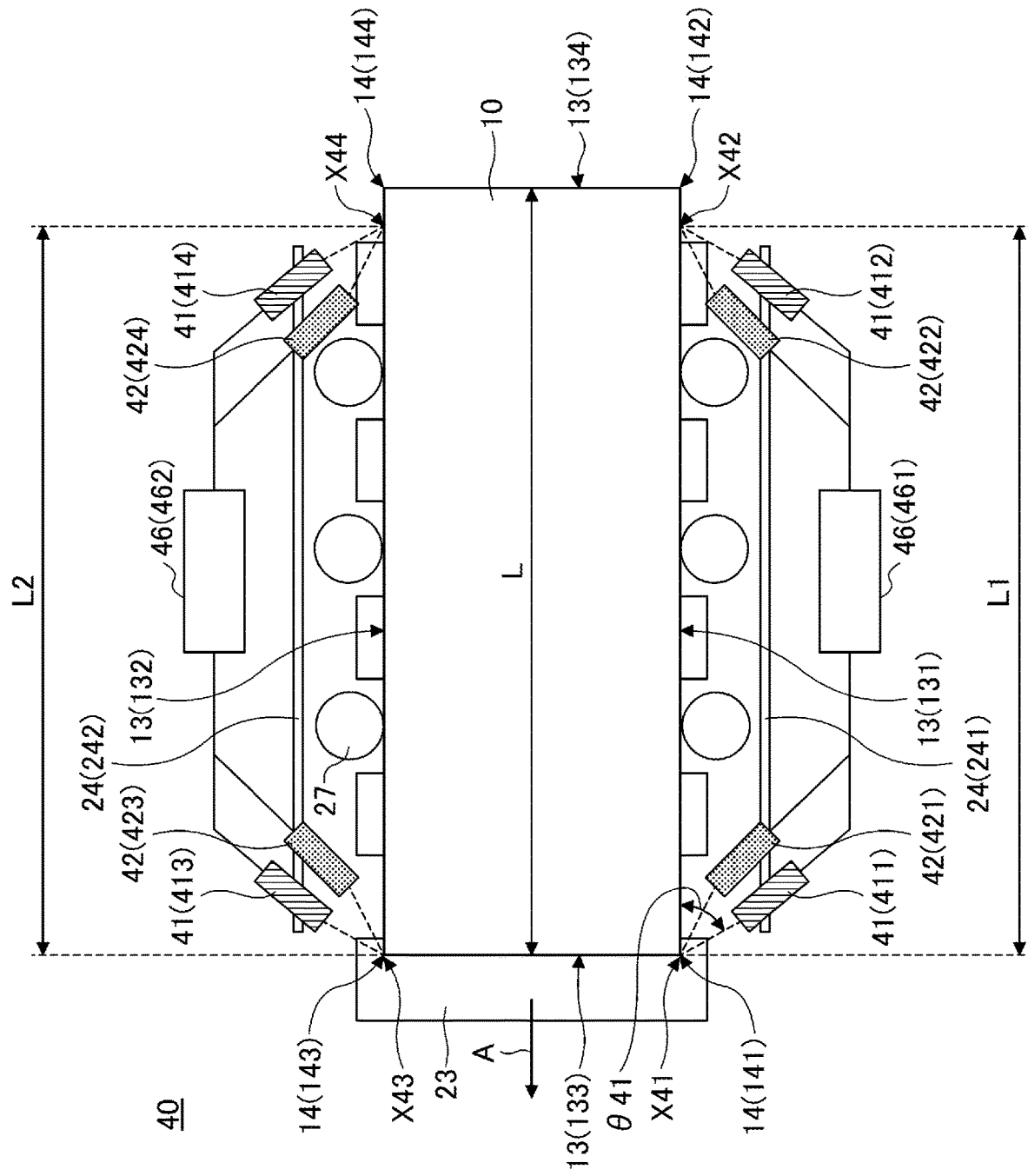
FIG. 4 is a diagram for describing an example of the configuration of the apparatus for inspecting plate-like bodies according to a third embodiment of the present invention.

Hereafter, an example of another configuration of the apparatus for inspecting plate-like bodies according to the present embodiment will be described with reference to FIG. 4. FIG. 4 is a top view of an apparatus 40 for inspecting plate-like bodies according to the present embodiment.

As illustrated in FIG. 4, the apparatus 40 for inspecting plate-like bodies according to the present embodiment can include light emitting units 41 each of which irradiates a given side surface 13 of the plate-like body 10 with light, and can include light receiving units 42 each of which receives light reflected with respect to a given side surface 13 of the plate-like body 10. Note that the light emitting units 41 and the light receiving units 42 are not particularly restricted. For example, for each of the light emitting units 41 and the light receiving units 42, the same unit as that described in the first embodiment can be used, and description for those units will be omitted. For other members, the same members as those described in the first embodiment are denoted by the same number, and description for those members will be partially omitted.

The apparatus 40 for inspecting plate-like bodies according to the present embodiment can include a light emitting unit 411 for detecting a first length, and a light emitting unit 412 for detecting a second length, which are light emitting units 41. The apparatus 40 can include a light receiving unit 421 for detecting a first length, and a light receiving unit 422 for detecting a second length, which are light receiving units 42.

The light emitting unit 411 for detecting a first length, and the light emitting unit 412 for detecting a second length can be disposed along the longitudinal direction of the first side surface 131 of the plate-like body 10. In this case, the light receiving unit 421 for detecting a first length can be disposed at a location at which light that is emitted by the light emitting unit 411 for detecting a first length and that is reflected with respect to the first side surface 131 can be received. The light receiving unit 422 for detecting a second length can be disposed at a location at which light that is emitted by the light emitting unit 412 for detecting a second length and that is reflected with respect to the first side surface 131 can be received.

If the time period ΔT1 below is shorter than a predetermined time period that is set in accordance with a longitudinal length L of the first side surface 131 and a speed at which a given conveying unit moves each of a position of light on the first side surface 131 emitted by the light emitting unit 411 for detecting a first length and a position of light on the first side surface 131 of the plate-like body 10 emitted by the light emitting unit 412 for detecting a second length, a given determining unit 46 can determine that there is a crack at a given longitudinal edge of the first side surface 131 of the plate-like body 10. Further, if the time period ΔT1 matches the predetermined time period, the given determining unit 46 can determine that there is no crack at each longitudinal edge of the first side surface 131 of the plate-like body 10.

Note that the time period ΔT1 means a time difference between a time point at which the light receiving unit 421 for detecting a first length starts receiving light, and a time point at which the light receiving unit 422 for detecting a second length terminates receiving light, in a case where a given conveying unit moves, from one edge of the first side surface 131 to another edge thereof and along the longitudinal direction of the first side surface 131, the position X41 of light on the first side surface 131 emitted by the light emitting unit 411 for detecting a first length, while moving, from one edge of the first side surface 131 to another edge thereof and along the longitudinal direction of the first side surface 131, the position X42 of light on the first side surface 131 emitted by the light emitting unit 412 for detecting a second length.

In the apparatus 40 for inspecting plate-like bodies according to the present embodiment, the light emitting unit 411 for detecting a first length, and the light emitting unit 412 for detecting a second length can be disposed on the side of the first side surface 131 of the plate-like body 10, along the longitudinal direction of the first side surface 131.

An angle θ41 set between an optical path of light emitted by the light emitting unit 411 for detecting a first length, toward the first side surface 131 of the plate-like body 10, as expressed by the dashed line in FIG. 4, and the first side surface 131 of the plate-like body 10, is not particularly restricted. For example, the angle can be adjusted such that light from the light emitting unit 411 for detecting a first length can be reflected with respect to a given surface being the first side surface 131. For example, the angle is preferably given by 30°≤θ41≤150°, more preferably 45°≤θ41≤135°, and even more preferably 75°≤θ41≤105°. In this description, the light emitting unit 411 for detecting a first length is described. However, as in the light emitting unit 411 for detecting a first length, other light emitting units for detecting a length can be each configured under a condition, such as an angle set between an optical path of light emitted by the light emitting unit 412 for detecting a second length, toward the first side surface 131 of the plate-like body 10, and the first side surface 131 of the plate-like body 10.

In this description, for example, the conveying unit 23 is used to move the plate-like body 10, which is a target object to be inspected, in the direction expressed by the arrow A in the figure, and thus the position X41 of light on the first side surface 131 emitted by the light emitting unit 411 for detecting a first length, and the position X42 of light on the first side surface 131 emitting unit 412 for detecting a second length are moved along the longitudinal direction of the first side surface 131, from one edge of the first side surface 131 to another edge thereof, that is, from the first corner 141 to the second corner 142.

In this case, each of the light receiving unit 421 for detecting a first length and the light receiving unit 422 for detecting a second length receives light only when the light emitted by a corresponding light emitting unit among the light emitting unit 411 for detecting a first length and the light emitting unit 412 for detecting a second length, is reflected with respect to the first side surface 131. If there is a crack at a given longitudinal edge of the first side surface 131, the light emitted by a given light emitting unit among the light emitting unit 411 for detecting a first length and the light emitting unit 412 for detecting a second length, is not reflected with respect to a cracked portion, and thus the given light emitting unit among the light emitting unit 411 for detecting a first length and the light emitting unit 412 for detecting a second length, does not receive the light.

In the example illustrated in FIG. 4, a time point (T11), at which the light receiving unit 422 for detecting a second length terminates receiving light, means a time point at which the second corner 142 of the plate-like body 10 passes through the position X42 of light on the first side surface 131 emitted by the light emitting unit 412 for detecting a second length. A time point (T12), at which the light receiving unit 421 for detecting a first length starts receiving light, means a time point at which the first corner 141 of the plate-like body 10 passes through the position X41 of light on the first side surface 131 emitted by the light emitting unit 411 for detecting a first length.

Here, a length (distance) between the position X41 of light on the first side surface 131 emitted by the light emitting unit 411 for detecting a first length, and the position X42 of light on the first side surface 131 emitted by the light emitting unit 412 for detecting a second length is set as a length L1. Also, when there is no crack in the plate-like body 10, a longitudinal length of the first side surface 131 is set as a length L.

In such a manner, if there is no crack in the plate-like body 10, ΔT1, indicating a difference between the T11 and the T12, is a value that is the same as a value obtained by dividing a difference between the length L and the length L1, by a moving speed of each of the position X41 of light on the first side surface 131 emitted by the light emitting unit 411 for detecting a first length, and the position X42 of light on the first side surface 131 emitted by the light emitting unit 412 for detecting a second length, where in this case, the moving speed corresponds to the speed at which the conveying unit 23 conveys the plate-like body 10. In contrast, if there is a crack at the first corner 141 or the second corner 142, which is a given longitudinal edge of the first side surface 131 of the plate-like body 10, ΔT1, indicating the difference between the T11 and the T12, is shorter than a value obtained by dividing a difference between the length L and the length L1, by a moving speed of each of the position X41 of light on the first side surface 131 emitted by the light emitting unit 411 for detecting a first length, and the position X42 of light on the first side surface 131 emitted by the light emitting unit 412 for detecting a second length, where in this case, the moving speed corresponds to the speed at which the conveying unit 23 conveys the plate-like body 10.

Thus, in this case, a given value obtained by dividing the difference between the length L and the length L1, by the speed at which the conveying unit 23 conveys the plate-like body 10, is set as a predetermined time period. When the ΔT1 is shorter than the predetermined time period, the first determining unit 461 can determine that there is a crack at the first corner 141 or the second corner 142, which is a given longitudinal edge of the first side surface 131 of the plate-like body 10.

In contrast, if a value obtained by dividing the difference between the length L and the length L1, by a speed at which the conveying unit 23 conveys the plate-like body 10, matches the ΔT1, the first determining unit 461 can determine that there is no crack at each of the first corner 141 and the second corner 142, which is a given longitudinal edge of the first side surface 131 of the plate-like body 10.

Note that from the viewpoint of a manufacturing condition or the like, the length L in the longitudinal direction of the first side surface 131 of the plate-like body 10 can be set in consideration of a predetermined tolerance. In such a case, for example, a length obtained by adding a given tolerance to the longitudinal length L of the first side surface 131 of the plate-like body can be used to calculate a predetermined time period to be used in the first determining unit 461, as described above. Further, in consideration of sensor accuracy or the like, a given tolerance can be also added to a predetermined time period used as a reference in the first determining unit 461.

In this description, the example in which in FIG. 4, the plate-like body 10 is conveyed in the direction expressed by the arrow A, is illustrated. However, the plate-like body 10 can be also conveyed in the direction opposite the direction expressed by the arrow A.

In this case, the time point (T11), at which the light receiving unit 422 for detecting a second length terminates receiving light, means a time point at which the first corner 141 of the plate-like body 10 passes through the position X42 of light on the first side surface 131 emitted by the light emitting unit 412 for detecting a second length. The time point (T12), at which the light receiving unit 421 for detecting a first length starts receiving light, means a time point at which the second corner 142 of the plate-like body 10 passes through the position X41 of light on the first side surface 131 emitted by the light emitting unit 411 for detecting a first length.

In such a manner, if there is no crack in the plate-like body 10, All, indicating a difference between the T11 and the T12, is a value that is the same as a value obtained by dividing the sum of the length L and the length L1, by a moving speed of each of the position X41 of light on the first side surface 131 emitted by the light emitting unit 411 for detecting a first length, and the position X42 of light on the first side surface 131 emitted by the light emitting unit 412 for detecting a second length, where in this case, the moving speed corresponds to the speed at which the conveying unit 23 conveys the plate-like body 10. In contrast, if there is a crack at the first corner 141 or the second corner 142, which is a given longitudinal edge of the first side surface 131 of the plate-like body 10, ΔT1, indicating the difference between the T11 and the T12, is smaller than a value obtained by dividing the sum of the length L and the length L1, by a moving speed of each of the position X41 of light on the first side surface 131 emitted by the light emitting unit 411 for detecting a first length, and the position X42 of light on the first side surface 131 emitted by the light emitting unit 412 for detecting a second length, where in this case, the moving speed corresponds to the speed at which the conveying unit 23 conveys the plate-like body 10.

Thus, in this case, a given value obtained by dividing the sum of the length L and the length L1, by the speed at which the conveying unit 23 conveys the plate-like body 10, is set as a predetermined time period, and when the ΔT1 is shorter than the predetermined time period, the first determining unit 461 can determine that there is a crack at the first corner 141 or the second corner 142, which is a given longitudinal edge of the first side surface 131 of the plate-like body 10.

In contrast, if a value obtained by dividing the sum of the length L and the length L1, by the speed at which the conveying unit 23 conveys the plate-like body 10, matches the ΔT1, the first determining unit 461 can determine that there is no crack at each of the first corner 141 and the second corner 142, which is a given longitudinal edge of the first side surface 131 of the plate-like body 10.

Note that in this case as well, the longitudinal length L of the first side surface 131 of the plate-like body 10, or the like can be used as a reference in the first determining unit 461, in consideration of a predetermined tolerance.

Moreover, the presence or absence of a crack at each longitudinal edge of the second side surface 132 can be also detected simultaneously.

In this case, the apparatus 40 for inspecting plate-like bodies according to the present embodiment can further include a light emitting unit 413 for detecting a third length and a light emitting unit 414 for detecting a fourth length, which are light emitting units 41. Also, the apparatus 40 for inspecting plate-like bodies includes a light receiving unit 423 for detecting a third length, and a light receiving unit 424 for detecting a fourth length, which are light receiving units 42.

The light emitting unit 413 for detecting a third length, and the light emitting unit 414 for detecting a fourth length can be disposed along the longitudinal direction of the second side surface 132 of the plate-like body 10. In this case, the light receiving unit 423 for detecting a third length can be disposed at a location at which light emitted by the light emitting unit 413 for detecting a third length and that is reflected with respect to the second side surface 132 can be received. The light receiving unit 424 for detecting a fourth length can be disposed at a location at which light that is emitted by the light emitting unit 414 for detecting a fourth length and that is reflected with respect to the second side surface 132 can be received.

If the time period ΔT2 below is shorter than a predetermined time period that is set in accordance with a longitudinal length L of the second side surface 132 and a speed at which a given conveying unit moves each of a position of light on the second side surface 132 emitted by the light emitting unit 413 for detecting a third length and a position of light on the second side surface 132 of the plate-like body 10 emitted by the light emitting unit 414 for detecting a fourth length, a given determining unit 46 can determine that there is a crack at each longitudinal edge of the second side surface 132 of the plate-like body 10. Further, if the time period ΔT2 matches a predetermined time period, the given determining unit 46 can determine that there is no crack at each longitudinal edge of the second side surface 132 of the plate-like body 10.

Note that the time period ΔT2 means a time difference between a time point at which the light receiving unit 423 for detecting a third length starts receiving light and a time point at which the light receiving unit 424 for detecting a fourth length terminates receiving light, in a case where a given conveying unit moves, from one edge of the second side surface 132 to another edge thereof and along the longitudinal direction of the second side surface 132, the position X43 of light on the second side surface 132 emitted by the light emitting unit 413 for detecting a third length, while moving, from one edge of the second side surface 132 to another edge thereof and along the longitudinal direction of the second side surface 132, the position X44 of light on the second side surface 132 emitted by the light emitting unit 414 for detecting a fourth length.

In the apparatus 40 for inspecting plate-like bodies according to the present embodiment, the light emitting unit 413 for detecting a third length, and the light emitting unit 414 for detecting a fourth length can be disposed on the side of the second side surface 132 of the plate-like body 10, along the longitudinal direction of the second side surface 132 thereof.

In this description, for example, the conveying unit 23 is used to move the plate-like body 10, which is a target object to be inspected, in the direction expressed by the arrow A in the figure, and thus the position X43 of light on the second side surface 132 emitted by the light emitting unit 413 for detecting a third length, and the position X44 of light on the second side surface 132 emitted by the light emitting unit 414 for detecting a fourth length are moved along the longitudinal direction of the second side surface 132, from one edge of the second side surface 132 to another edge thereof, that is, from the third corner 143 to the fourth corner 144.

In this case, each of the light receiving unit 423 for detecting a third length and the light receiving unit 424 for detecting a fourth length receives light only when the light emitted by a corresponding light emitting unit among the light emitting unit 413 for detecting a third length and the light emitting unit 414 for detecting a fourth length, is reflected with respect to the second side surface 132. If there is a crack at a given longitudinal edge of the second side surface 132, the light emitted by a given light emitting unit, among the light emitting unit 413 for detecting a third length and the light emitting unit 414 for detecting a fourth length, is not reflected with respect to a cracked portion, and thus the given light emitting unit among the light emitting unit 413 for detecting a third length and the light emitting unit 414 for detecting a fourth length, does not receive the light.

In the example illustrated in FIG. 4, a time point (T21), at which the light receiving unit 424 for detecting a fourth length terminates receiving light, means a time point at which the fourth corner 144 of the plate-like body 10 passes through the position X44 of light on the second side surface 132 emitted by the light emitting unit 414 for detecting a fourth length. A time point (T22), at which the light receiving unit 423 for detecting a third length starts receiving light, means a timing at which the third corner 143 of the plate-like body 10 passes through the position X43 of light on the second side surface 132 emitted by the light emitting unit 413 for detecting a third length.

Here, a length (distance) between the position X43 of light on the second side surface 132 emitted by the light emitting unit 413 for detecting a third length and the position X44 of light on the second side surface 132 emitted by the light emitting unit 414 for detecting a fourth length is set as a length L2. Also, when there is no crack in the plate-like body 10, a longitudinal length of the second side surface 132 is set as a length L.

In such a manner, if there is no crack in the plate-like body 10, ΔT2, indicating a difference between the T21 and the T22, is a value that is the same as a value obtained by dividing a difference between the length L and the length L2, by a moving speed of each of the position X43 of light on the second side surface 132 emitted by the light emitting unit 413 for detecting a third length, and the position X44 of light on the second side surface 132 emitted by the light emitting unit 414 for detecting a fourth length, where in this case, the moving speed corresponds to the speed at which the conveying unit 23 conveys the plate-like body 10. In contrast, if there is a crack at the third corner 143 or the fourth corner 144, which is a given longitudinal edge of the second side surface 132 of the plate-like body 10, ΔT2, indicating the difference between the T21 and the T22, is smaller than a value obtained by dividing a difference between the length L and the length L2, by a moving speed of each of the position X43 of light on the second side surface 132 emitted by the light emitting unit 413 for detecting a third length, and the position X44 of light on the second side surface 132 emitted by the light emitting unit 414 for detecting a fourth length, where in this case, the moving speed corresponds to the speed at which the conveying unit 23 conveys the plate-like body 10. Thus, in this case, a given value obtained by dividing the difference between the length L and the length L2, by the speed at which the conveying unit 23 conveys the plate-like body 10, is set as a predetermined time period, and if the ΔT2 is shorter than the predetermined time period, the second determining unit 462 can determine that there is a crack at the third corner 143 or the fourth corner 144, which is at a given longitudinal edge of the second side surface 132 of the plate-like body 10.

In contrast, if the value obtained by dividing the difference between the length L and the length L2, by the speed at which the conveying unit 23 conveys the plate-like body 10, matches the ΔT2, the second determining unit 462 can determine that there is no crack at each of the third corner 143 and the fourth corner 144, which is a given longitudinal edge of the second side surface 132 of the plate-like body 10.

Note that from the viewpoint of a manufacturing condition or the like, the longitudinal length L of the second side surface 132 of the plate-like body 10 can be set in consideration of a predetermined tolerance. In such a case, for example, a length obtained by adding a predetermined tolerance to a standardized longitudinal length L of a given second side surface 132 is used to be able to calculate the predetermined time period described above to be used in the second determining unit 462. Further, in consideration of sensor accuracy or the like, a given tolerance can be also added to the predetermined time period used as a reference in the second determining unit 462.

In this description, the example in which, in FIG. 4, the plate-like body 10 is conveyed in the direction expressed by the arrow A, is illustrated. However, the plate-like body 10 can be also conveyed in the direction opposite the direction expressed by the arrow A.

In this case, the time point (T21), at which the light receiving unit 424 for detecting a fourth length terminates receiving light, means a time point at which the third corner 143 of the plate-like body 10 passes through the position X44 of light on the second side surface 132 emitted by the light emitting unit 414 for detecting a fourth length. The time point (T22), at which the light receiving unit 423 for detecting a third length starts receiving light, means a timing at which the fourth corner 144 of the plate-like body 10 passes through the position X43 of light on the second side surface 132 emitted by the light emitting unit 413 for detecting a third length.

In such a manner, if there is no crack in the plate-like body 10, ΔT2, indicating a difference between the T21 and the T22, is a value that is the same as a value obtained by dividing the sum of the length L and the length L2, by a moving speed of each of the position X43 of light on the second side surface 132 emitted by the light emitting unit 413 for detecting a third length, and the position X44 of light on the second side surface 132 emitted by the light emitting unit 414 for detecting a fourth length, where in this case, the moving speed corresponds to the speed at which the conveying unit 23 conveys the plate-like body 10. In contrast, if there is a crack at the third corner 143 or the fourth corner 144, which is a given longitudinal edge of the second side surface 132 of the plate-like body 10, ΔT2, indicating the difference between the T21 and the T22, is smaller than a value obtained by dividing the sum of the length L and the length L2, by a moving speed of each of the position X43 of light on the second side surface 132 emitted by the light emitting unit 413 for detecting a third length, and the position X44 of light on the second side surface 132 emitted by the light emitting unit 414 for detecting a fourth length, where the moving speed corresponds to the speed at which the conveying unit 23 conveys the plate-like body 10. Thus, a given value obtained by dividing the sum of the length L and the length L2, by the speed at which the conveying unit 23 conveys the plate-like body 10, is set as a predetermined time period, and if the ΔT2 is shorter than the predetermined time period, the second determining unit 462 can determine that there is a crack at the third corner 143 or the fourth corner 144, which is a given longitudinal edge of the second side surface 132 of the plate-like body 10.

In contrast, if a value obtained by dividing the sum of the length L and the length L2, by the speed at which the conveying unit 23 conveys the plate-like body 10, matches the ΔT2, the second determining unit 462 can determine that there is no crack at each of the third corner 143 and the second corner 142, which is a given longitudinal edge of the second side surface 132 of the plate-like body 10.

Note that in this case as well, the longitudinal length L of the first side surface 131 of the plate-like body 10, or the like can be used as a reference in the second determining unit 462, in consideration of a predetermined tolerance.

The example in which the conveying unit 23 is used to convey the plate-like body 10 has been described above, but the manner of conveying a given plate-like body 10 is not limiting. As an example of such a configuration, at least one among the conveying unit 241 for a first light emitting unit, and the conveying unit 242 for a second light emitting unit, can be used to vary a given position of light, on a given side surface 13 of the plate-like body 10, emitted by a given light emitting unit 41, such as the light emitting unit 411 for detecting a first length.

For a predetermined time period as a reference used when a given determining unit 46 performs a determination, it is not limited to the example described above, and can be appropriately selected in accordance with the shape or the like of a given plate-like body.

In FIG. 4, the example in which the first determining unit 461 and the second determining unit 462 are provided as determining units 46 is illustrated. However, such a manner is not limiting, and for example, a single determining unit 46 can be adopted.

First to third embodiments have been described above using the examples of the configuration of an apparatus for inspecting plate-like bodies. The apparatus for inspecting plate-like bodies according to each embodiment can be individually used, or a combination of given apparatuses for inspecting plate-like bodies described in one or more embodiments can be used.

The apparatus for inspecting plate-like bodies described above can be used as a single inspection apparatus. Further, for example, such an apparatus can be also incorporated into an apparatus for manufacturing plate-like bodies. In other words, the apparatus for inspecting plate-like bodies described above can be used as an apparatus for manufacturing plate-like bodies.

Although the apparatus for inspecting plate-like bodies has been described in one or more embodiments and the like, the present invention is not limited to the embodiments and the like described above. Various modifications and changes can be made within a scope of the present invention set forth in the claims.

This international application claims priority under Japanese Patent Application No. 2019-036625, filed Feb. 28, 2019, the entirety of which is incorporated herein by reference.

REFERENCE SIGNS LIST 10 plate-like body
111, 112 coating material
12 core
13 side surface
131 first side surface
132 second side surface
133 third side surface
134 fourth side
14 corner
141 first corner
142 second corner
143 third corner
144 fourth corner
20, 30, 40 apparatus for inspecting plate-like bodies
21, 31, 41 light emitting unit
211 first light emitting unit
212 second light emitting unit
311 light emitting unit for first edge detection
312 light emitting unit for second edge detection
313 light emitting unit for third edge detection
314 light emitting unit for fourth edge detection
411 light emitting unit for detecting a first length
412 light emitting unit for detecting a second length
413 light emitting unit for detecting a third length
414 light emitting unit for detecting a fourth length
22, 32, 42 light receiving unit
221 first light receiving unit
222 second light receiving unit
321 light receiving unit for first edge detection
322 light receiving unit for second edge detection
323 light receiving unit for third edge detection
324 light receiving unit for fourth edge detection
421 light receiving unit for detecting a first length
422 light receiving unit for detecting a second length
423 light receiving for detecting a third length
424 light receiving for detecting a fourth length
23, 24 conveying unit 241 conveying unit for a first light emitting unit
242 conveying unit for a second light emitting unit
25 distance calculating unit
251 first distance calculating unit
252 second distance calculating unit
26, 36, 46 determining unit
261 first determining unit
262 second determining unit
27 side position adjuster
X31 to X34, X41 to X44 position
11, 12 straight line

The invention claimed is:

1. An apparatus for inspecting plate-like bodies to inspect a side surface of a plate-like body with sheeted coating materials on a top side and bottom side of the plate-like body, the apparatus comprising:
at least one light emitting unit configured to irradiate the side surface of the plate-like body with light;
at least one light receiving unit configured to receive light reflected with respect to the side surface of the plate-like body;
a conveying unit configured to move at least one among the light emitting unit and the plate-like body and to vary a position of the light on the side surface of the plate-like body, emitted by the light emitting unit;
a distance calculating unit configured to calculate a distance between the light emitting unit and the side surface of the plate-like body, by using the light emitted by the light emitting unit; and
a determining unit configured to determine whether the side surface of the plate-like body has a defect based on the distance between the light emitting unit and the side surface of the plate-like body, calculated by the distance calculating unit, upon occurrence of a condition under which the conveying unit varies the position of the light on the side surface of the plate-like body, emitted by the light emitting unit,
wherein the at least one light emitting unit includes a first light emitting unit and a second light emitting unit,
wherein the at least one light receiving unit includes a first light receiving unit and a second light receiving unit,
wherein the first light emitting unit and the first light receiving unit are disposed on a side of a first side surface of the plate-like body,
wherein the second light emitting unit and the second light receiving unit are disposed on a side of a second side surface of the plate-like body opposite the first side surface thereof,
wherein the distance calculating unit is configured to calculate, by using light emitted by the first light emitting unit, a first distance that is a distance between the first light emitting unit and the first side surface of the plate-like body and to calculate, by using light emitted by the second light emitting unit, a second distance that is a distance between the second light emitting unit and the second side surface of the plate-like body, and
wherein the determining unit is configured to determine whether the first side surface of the plate-like body has a defect based on the first distance and to determine whether the second side surface of the plate-like body has a defect based on the second distance.

2. The apparatus for inspecting plate-like bodies according to claim 1, further comprising a side position adjuster configured to adjust a position where the side surface of the plate-like body is to be disposed.

3. An apparatus for inspecting plate-like bodies to inspect a side surface of a plate-like body with sheeted coating materials on a top side and bottom side of the plate-like body, the apparatus comprising:
at least one light emitting unit configured to irradiate the side surface of the plate-like body with light;
at least one light receiving unit configured to receive light reflected with respect to the side surface of the plate-like body;
a conveying unit configured to move at least one among the light emitting unit and the plate-like body and to vary a position of the light on the side surface of the plate-like body, emitted by the light emitting unit; and
a determining unit configured to determine whether the side surface of the plate-like body has a defect, by using the light emitted by the light emitting unit, upon occurrence of a condition under which the conveying unit varies the position of the light on the side surface of the plate-like body, emitted by the light emitting unit,
wherein the at least one light emitting unit includes a light emitting unit for first edge detection and a light emitting unit for second edge detection,
wherein the at least one light receiving unit includes a light receiving unit for first edge detection and a light receiving unit for second edge detection,
wherein the light emitting unit for first edge detection and the light receiving unit for first edge detection are disposed on a side of a first side surface of the plate-like body,
wherein the light emitting unit for second edge detection and the light receiving unit for second edge detection are disposed on a side of a second side surface of the plate-like body opposite the first side surface thereof,
wherein a straight line connecting a position of light on the first side surface of the plate-like body to be emitted by the light emitting unit for first edge detection, and a position of light on the second side surface of the plate-like body to be emitted by the light emitting unit for second edge detection, is parallel to a third side surface of the plate-like body located between the first side surface and the second side surface thereof, and
wherein, in a case where the conveying unit moves, along a longitudinal direction of the first side surface, the position of the light on the first side surface of the plate-like body, emitted by the light emitting unit for first edge detection, while moving, along a longitudinal direction of the first side surface, the position of the light on the second side surface of the plate-like body, emitted by the light emitting unit for second edge detection, respective positions of the light including points at edges of the third side surface of the plate-like body,
the determining unit is configured to determine that there is a defect at an edge of the third side surface of the plate-like body, upon occurrence of a condition under which a time point at which the light emitting unit for first edge detection starts receiving the light and a time point at which the light emitting unit for second edge detection starts receiving the light do not match, or a condition under which a time point at which the light emitting unit for first edge detection terminates receiving the light and a time point at which the light emitting unit for second edge detection terminates receiving the light do not match.

4. The apparatus for inspecting plate-like bodies according to claim 3, wherein the at least one light emitting unit includes a light emitting unit for third edge detection and a light emitting unit for fourth edge detection,
    wherein the at least one light receiving unit includes a light receiving unit for third edge detection and a light receiving unit for fourth edge detection,
    wherein the light emitting unit for third edge detection and the light receiving unit for third edge detection are disposed on the side of the first side surface of the plate-like body,
    wherein the light emitting unit for fourth edge detection and the light receiving unit for fourth edge detection are disposed on the side of the second side surface of the plate-like body,
    wherein a straight line connecting a position of light on the first side surface of the plate-like body to be emitted by the light emitting unit for third edge detection, and a position of light on the second side surface of the plate-like body to be emitted by the light emitting unit for fourth edge detection, is parallel to a fourth side surface of the plate-like body opposite the third side surface thereof, and
    wherein, in a case where the conveying unit moves, along the longitudinal direction of the first side surface, the position of the light on the first side surface of the plate-like body, emitted by the light emitting unit for third edge detection, while moving, along the longitudinal direction of the second side surface, the position of the light on the second side surface of the plate-like body, emitted by the light emitting unit for fourth edge detection, respective positions of the light including points at edges of the fourth side surface of the plate-like body,
    the determining unit is configured to determine that there is a defect at an edge of the fourth side surface of the plate-like body, upon occurrence of a condition under which a time point at which the light emitting unit for third edge detection starts receiving the light and a time point at which the light emitting unit for fourth edge detection starts receiving the light do not match, or a condition under which a time point at which the light emitting unit for third edge detection terminates receiving the light and a time point at which the light emitting unit for fourth edge detection terminates receiving the light do not match.

5. An apparatus for inspecting plate-like bodies to inspect a side surface of a plate-like body with sheeted coating materials on a top side and bottom side of the plate-like body, the apparatus comprising:
    at least one light emitting unit configured to irradiate the side surface of the plate-like body with light;
    at least one light receiving unit configured to receive light reflected with respect to the side surface of the plate-like body;
    a conveying unit configured to move at least one among the light emitting unit and the plate-like body and to vary a position of the light on the side surface of the plate-like body, emitted by the light emitting unit; and
    a determining unit configured to determine whether the side surface of the plate-like body has a defect, by using the light emitted by the light emitting unit, upon occurrence of a condition under which the conveying unit varies the position of the light on the side surface of the plate-like body, emitted by the light emitting unit,
    wherein the at least one light emitting unit includes a light emitting unit for detecting a first length and a light emitting unit for detecting a second length,
    wherein the at least one light receiving unit includes a light receiving unit for detecting a first length and a light receiving unit for detecting a second length,
    wherein the light emitting unit for detecting a first length and the light emitting unit for detecting a second length are disposed along a longitudinal direction of a first side surface of the plate-like body,
    wherein the light receiving unit for detecting a first length is disposed at a location at which light that is emitted by the light emitting unit for detecting a first length and that is reflected with respect to the first side surface of the plate-like body is to be received, and the light receiving unit for detecting a second length is disposed at a location at which light that is emitted by the light emitting unit for detecting a second length and that is reflected with respect to the first side surface of the plate-like body is to be received, and
    wherein, in a case where the conveying unit moves, from one edge of the first side surface to another edge thereof and along the longitudinal direction of the first side surface, a position of light on the first side surface of the plate-like body, emitted by the light emitting unit for detecting a first length, while moving, from one edge of the first side surface to another edge thereof and along the longitudinal direction of the first side surface, a position of light on the first side surface of the plate-like body, emitted by the light emitting unit for detecting a second length,
    the determining unit is configured to determine that there is a defect at a longitudinal edge of the first side surface of the plate-like body, upon occurrence of a condition under which a time difference between a time point at which the light receiving unit for detecting a first length starts receiving the light, and a time point at which the light receiving unit for detecting a second length terminates receiving the light, is shorter than a predetermined time period, the predetermined time period being set in accordance with a longitudinal length of the first side surface and a speed at which the conveying unit moves each of the position of the light on the first side surface of the plate-like body, emitted by the light emitting unit for detecting a first length, and the position of the light on the first side surface of the plate-like body, emitted by the light emitting unit for detecting a second length.

6. The apparatus for inspecting plate-like bodies according to claim 5, wherein the at least one light emitting unit includes a light emitting unit for detecting a third length and a light emitting unit for detecting a fourth length,
    wherein the at least one light receiving unit includes a light receiving unit for detecting a third length and a light receiving unit for detecting a fourth length,
    wherein the light emitting unit for detecting a third length and the light emitting unit for detecting a fourth length are disposed along a longitudinal direction of a second side surface of the plate-like body opposite the first side surface thereof,
    wherein the light receiving unit for detecting a third length is disposed at a location at which light that is emitted by the light emitting unit for detecting a third length and that is reflected with respect to the second side surface of the plate-like body is to be received, and the light receiving unit for detecting a fourth length is disposed at a location at which light that is emitted by the light emitting unit for detecting a fourth length and that is reflected with respect to the second side surface of the plate-like body is to be received, and wherein, in a case where the conveying unit moves, from one edge of the second side surface to another edge thereof and along the longitudinal direction of the second side surface, a position of light on the second side surface of the plate-like body, emitted by the light emitting unit for detecting a third length, while moving, from one edge of the second side surface to another edge thereof and along the longitudinal direction of the second side surface, a position of light on the second side surface of the plate-like body, emitted by the light emitting unit for detecting a fourth length, the determining unit is configured to determine that there is a defect at a longitudinal edge of the second side surface of the plate-like body, upon occurrence of a condition under which a time difference between a time point at which the light receiving unit for detecting a third length starts receiving the light, and a time point at which the light receiving unit for detecting a fourth length terminates receiving the light, is shorter than a predetermined time period, the predetermined time period being set in accordance with a longitudinal length of the second side surface and a speed at which the conveying unit moves each of the position of the light on the second side surface of the plate-like body, emitted by the light emitting unit for detecting a third length, and the position of the light on the second side surface of the plate-like body, emitted by the light emitting unit for detecting a fourth length.

* * * * *